US009898593B2

United States Patent
Sun et al.

(10) Patent No.: US 9,898,593 B2
(45) Date of Patent: Feb. 20, 2018

(54) SYSTEM AND METHOD FOR FORENSIC ANALYSIS OF MEDIA WORKS

(71) Applicant: NBCUniversal Media, LLC, New York, NY (US)

(72) Inventors: Zhaohui Harry Sun, Niskayuna, NY (US); Catherine Mary Graichen, Malta, NY (US); Corey Nicholas Bufi, Troy, NY (US); Anthony James Hoogs, Niskayuna, NY (US); Aaron Shaw Markham, Pasadena, CA (US); Budhaditya Deb, Niskayuna, NY (US); Roderic Greene Collins, Troy, NY (US); Michael Shane Wilkinson, Newhall, CA (US); Anthony Christopher Anderson, Castaic, CA (US); Jenny Marie Weisenberg Williams, Niskayuna, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 0 days.

(21) Appl. No.: 14/317,591

(22) Filed: Jun. 27, 2014

(65) Prior Publication Data

US 2014/0380493 A1 Dec. 25, 2014

Related U.S. Application Data

(63) Continuation of application No. 12/276,433, filed on Nov. 24, 2008, now Pat. No. 8,793,498.

(Continued)

(51) Int. Cl.
H04L 9/32 (2006.01)
G06F 21/16 (2013.01)
(Continued)

(52) U.S. Cl.
CPC .............. *G06F 21/16* (2013.01); *G06T 1/005* (2013.01); *G06T 1/0085* (2013.01);
(Continued)

(58) Field of Classification Search
CPC ..... G06T 1/0021; G06T 1/0071; G06T 1/005; G06T 1/0085; H04N 21/8358; H04N 21/8352; H04N 1/32144; G06F 21/16
(Continued)

(56) References Cited

U.S. PATENT DOCUMENTS 6,289,455 B1 9/2001 Kocher et al.
6,425,081 B1 7/2002 Iwamura
(Continued)

FOREIGN PATENT DOCUMENTS

WO 2004097827 A2 11/2004
WO 2006091928 A2 8/2006

OTHER PUBLICATIONS

Timothy C. Hoad and Justin Zobel. 2003. Fast video matching with signature alignment. In Proceedings of the 5th ACM SIGMM international workshop on Multimedia information retrieval (MIR Nov. 2003). ACM, New York, NY, USA, 262-269. DOI=http://dx.doi.org/10.1145/973264.973304.*

(Continued)

*Primary Examiner* — Eric W Shepperd
*Assistant Examiner* — Feliciano Mejia
(74) *Attorney, Agent, or Firm* — Fletcher Yoder, P.C.

(57) ABSTRACT

A method and system for identifying a source of a copied work that in one embodiment includes obtaining at least some portions of a reference work, collecting at least some portions of the suspect work, matching the suspect work with the reference work, wherein the matching includes temporally aligning one or more frames of the reference work and the suspect work, spatially aligning frames of the (Continued)

reference work and the suspect work, and detecting forensic marks in the suspect work by spatiotemporal matching with the reference work.

20 Claims, 13 Drawing Sheets

Related U.S. Application Data

(60) Provisional application No. 61/188,592, filed on Aug. 11, 2008.

(51) Int. Cl.
*G06T 1/00* (2006.01)
*H04N 1/32* (2006.01)

(52) U.S. Cl.
CPC . *H04N 1/32144* (2013.01); *G06T 2201/0065* (2013.01); *G06T 2201/0081* (2013.01)

(58) Field of Classification Search
USPC .......................... 382/232; 713/176, 179, 180
See application file for complete search history.

(56) References Cited

U.S. PATENT DOCUMENTS

| | | | |
|---|---|---|---|
| 6,496,591 B1 | 12/2002 | Rhoads | |
| 6,782,116 B1 | 8/2004 | Zhao et al. | |
| 6,792,129 B1 | 9/2004 | Zeng et al. | |
| 7,171,016 B1 | 1/2007 | Rhoads | |
| 7,218,754 B2 | 5/2007 | Schumann et al. | |
| 7,237,123 B2 | 6/2007 | LeVine et al. | |
| 7,263,615 B2* | 8/2007 | Pelly .................. | H04N 1/32165 382/181 |
| 7,277,488 B2 | 10/2007 | Tapson | |
| 7,363,278 B2 | 4/2008 | Schmelzer et al. | |
| 7,366,361 B2 | 4/2008 | Cheng | |
| 7,366,909 B2 | 4/2008 | Zhou et al. | |
| 7,403,708 B2 | 7/2008 | Stwertka et al. | |
| 7,433,489 B2* | 10/2008 | Wendt .................... | G06T 1/005 382/100 |
| 7,532,804 B2 | 5/2009 | Kim | |
| 7,562,228 B2 | 7/2009 | Kirovski et al. | |
| 7,676,058 B2 | 3/2010 | Fan | |
| 7,840,005 B2 | 11/2010 | Delp et al. | |
| 7,899,205 B2 | 3/2011 | Pelly et al. | |
| 7,979,710 B2 | 7/2011 | Schultz et al. | |
| 8,165,343 B1* | 4/2012 | McGowan ......... | H04N 21/8358 348/461 |
| 8,259,806 B2* | 9/2012 | Radhakrishnan . | G06F 17/30799 375/240.15 |
| 8,358,840 B2* | 1/2013 | Bronstein ......... | G06F 17/30784 382/168 |
| 8,374,386 B2* | 2/2013 | Bayram ............ | G06F 17/30799 382/100 |
| 8,538,136 B2* | 9/2013 | Wilkinson ......... | H04N 1/32149 382/100 |
| 2004/0184530 A1 | 9/2004 | Cheng | |
| 2005/0154892 A1 | 7/2005 | Mihcak et al. | |
| 2006/0103732 A1 | 5/2006 | Bateman | |
| 2006/0277609 A1 | 12/2006 | Brandon | |
| 2007/0038861 A1 | 2/2007 | Weber et al. | |
| 2007/0101147 A1 | 5/2007 | Brunk et al. | |
| 2008/0059426 A1 | 3/2008 | Brock et al. | |
| 2009/0031134 A1 | 1/2009 | Levy | |
| 2012/0030209 A1* | 2/2012 | Bause ................ | G06F 17/3002 707/741 |
| 2015/0067341 A1* | 3/2015 | Deen ...................... | H04L 63/10 713/176 |

OTHER PUBLICATIONS

Yap-Peng Tan, S. R. Kulkarni and P. J. Ramadge, "A framework for measuring video similarity and its application to video query by example," Proceedings 1999 International Conference on Image Processing, Kobe, Jun. 1999, pp. 106-110 vol. 2.doi: 10.1109/ICIP. 1999.822864, URL: http://ieeexplore.ieee.org/stamp/stamp.jsp?tp= &arnumber=822864&isnumber=17708.*

Weihong Wang and Hany Farid. 2007. Exposing digital forgeries in video by detecting duplication. In Proceedings of the 9th workshop on Multimedia & security (MM&Sec Sep. 2007). ACM, New York, NY, USA, 35-42. DOI=http://dx.doi.org/10.1145/1288869. 1288876.*

N. Dimitrova et al., "Applications of video-content Analysis and Retrieval," IEEE 2002, 1070-986X/02, pp. 42-55.

PCT International Search Report dated Dec. 21, 2009.

Sun, "Image Comparison by Compound Disjoint Information," IEEE Computer Society Conference on Computer Vision and Pattern Recognition, 2006.

Smeulders, "Content-Based Image Retrieval at the End of the Early Years," IEEE Transactions on Pattern Analysis and Machine Intelligence, vol. 22, No. 12, pp. 1349-1380, Dec. 2000.

Schneider, M.; Shih-Fu-Chang: "A Robust Content Based Digital Signature for Image Processing," Image Processing, 1996. Proceedings., International Conference on, vol. 3, pp. 227-230, Sep. 1996, URL: http://ieeexplore.ieee.org/stamp/stamp.jsp?tp=&arnumber= 560425&isnumber=12210.

* cited by examiner

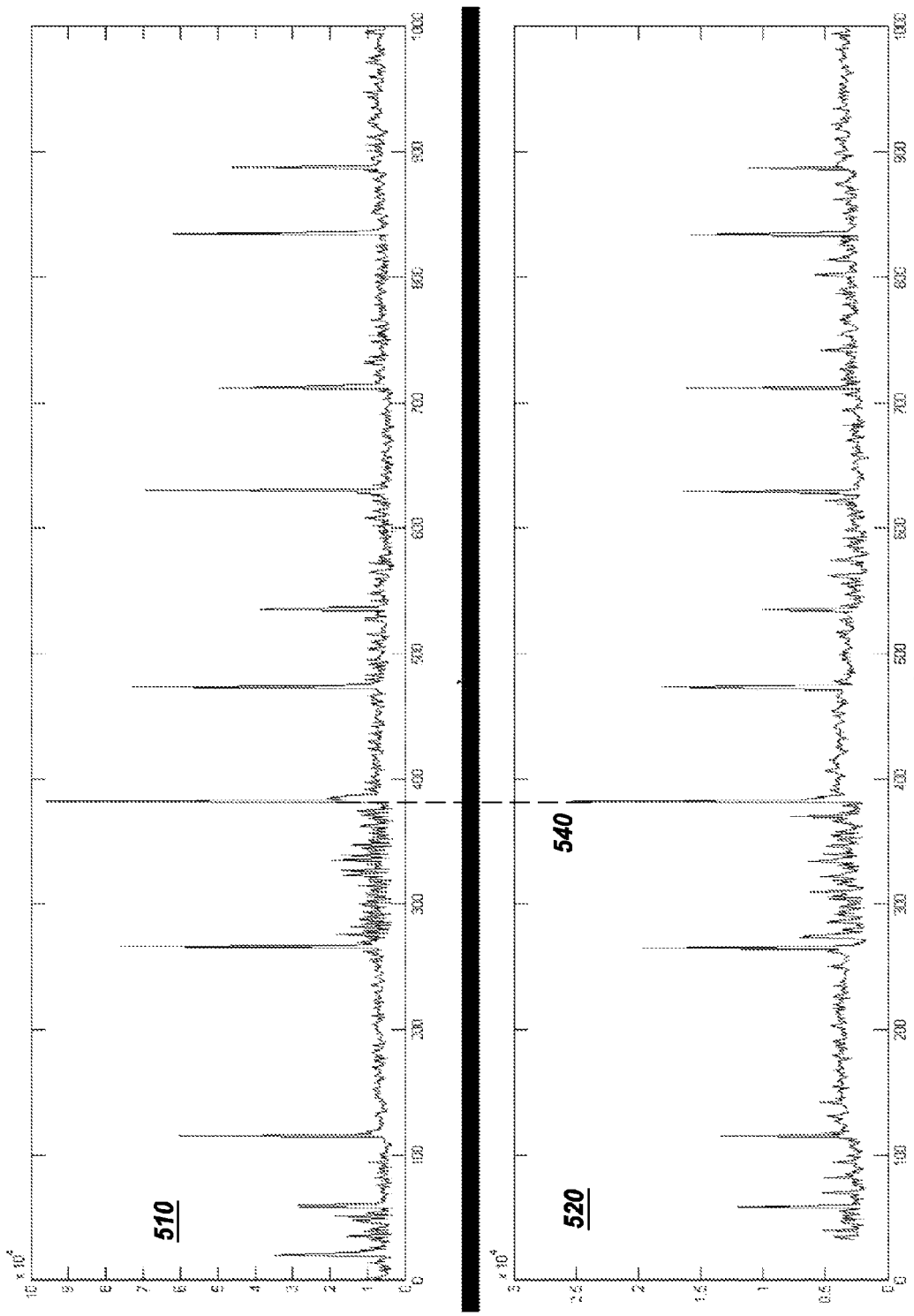

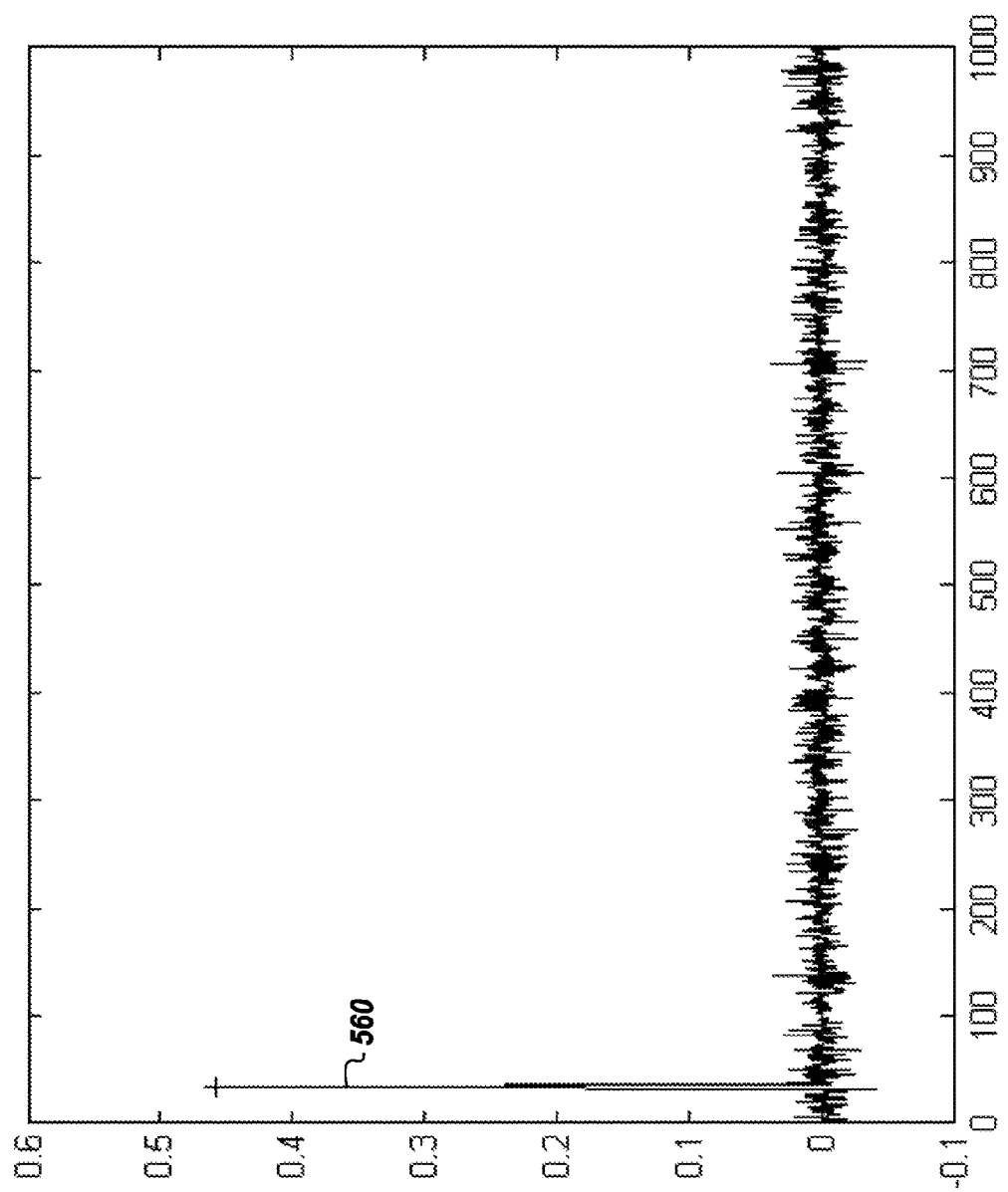

Fig. 9

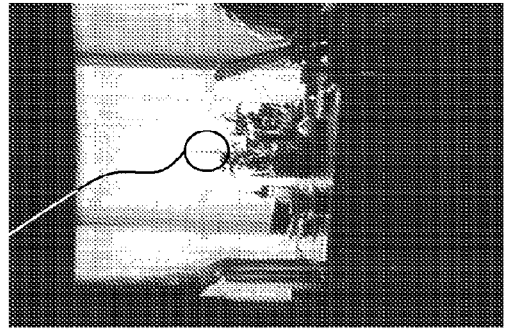
*Fig. 10A*
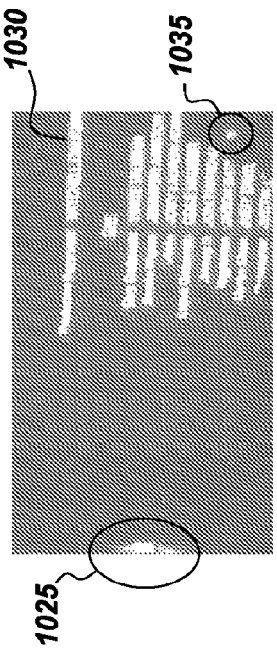
*Fig. 10B*
*Fig. 10C*
*Fig. 10D*

SYSTEM AND METHOD FOR FORENSIC ANALYSIS OF MEDIA WORKS

CROSS REFERENCE TO RELATED APPLICATIONS

This application is a continuation of U.S. patent application Ser. No. 12/276,433, filed Nov. 24, 2008, which claims the benefit of U.S. Provisional Application No. 61/188,592, filed Aug. 11, 2008. The entire disclosures of U.S. Provisional Application No. 61/188,592 and U.S. patent application Ser. No. 12/276,433 are herein incorporate by reference.

BACKGROUND OF THE INVENTION

The misappropriation and improper distribution of video and audio works results in substantial revenue losses for producers of the content. These losses are passed onto the public by higher prices on the legitimately purchased works. Thus, improper distribution, also sometimes referred to as piracy, of high value content is therefore a major concern for providers of such content.

Due to technical advances, it is easier than ever to download, copy, edit, and distribute large files such as movies. Based on an estimate from the Motion Picture Association (MPA), the worldwide motion picture industry, including domestic and international producers, distributors, theaters, video stores and pay-per-view operators lose billions every year as a result of improper distribution. It harms the entertainment industry and U.S. economy due to loss of revenue, jobs, and export surplus. Piracy also hurts consumers as it thwarts innovation and is a scourge to the public as well as the industries and artists that help to generate valuable works. Further details are available from "The Cost of Movie Piracy" available at http://www.mpaa.org/leksummaryMPA%20revised.pdf.

Another ill effect of improper distribution is that poor quality copies of the works are distributed which results in a lower entertainment experience from the end users. The artists and the producers also suffer from these poor quality pirated copies, as their reputation and hard work are not being given proper representation.

Typically, copies of the original content are stored in digital media files. As these digital copies are shared, different versions may be constructed by transforming the digital files. These transformations are varied, but some examples are resizing the video images, changing aspect ratio, adding or removing borders, applying different video and audio compression algorithms to reduce the file size, adding subtitles, cropping the images, mixing different audio tracks, such as other languages with a video track and changing frame rates for play back on different devices.

One way of fighting improper distribution is to embed unique and identifiable information into video and audio content, such as forensic marks. As used herein, forensic marks refer to any of the indicia that can be used to identify a particular work, whether deliberate or unintentional, active or passive. Some of these marks are not truly discernable at normal play back condition, but are detectable by content analysis. The objective of such marks is to make them detectable even after the copy has undergone different transformations from the original source. Marking techniques are sometimes used to help identify a legitimate work from one that has been improperly copied and distributed.

Digital watermarking is the process of embedding information into a digital signal. If the signal is directly copied, the watermark information is transferred to the copy. Invisible watermarking refers to watermarking that is hidden from visibility making detection by unauthorized persons more difficult. In a typical watermarking system, the watermark is embedded into the host file such that any copy from the host or source file contains the watermark. During the detection or extraction phase, processing is performed to locate and identify the watermark and therefore locate the source of the digital work. As with visible forensic marks, the intent of the digital watermark is to create an addition to the original content that will remain regardless of the transformations applied to digital copies. However, since digital watermarks are not visible, they may not be reproduced when the content undergoes digital-to-analog or analog-to-digital conversion, such as videotaping and screen projection, sometimes referred to as the analog hole or analog reconversion problem.

Presently, the analysis for the markings is largely addressed by manual inspection of the media files. However, due to the large data size involved in motion pictures, it takes a long time for manual processing, limiting the throughput and consistency of detection results. Manually analyzing pirated media is a slow, tedious process and thus limits the ability of an organization to efficiently determine relationships between pirate copies and take timely measures to remediate.

FIG. 1 illustrates basic considerations associated with the conventional video content analysis. In this example, a video or audio/video work includes certain markings 5 that may be deliberately inserted such as a discreet forensic mark or a result of the copying process. For example, marks can be inserted in various frames throughout the work to provide accurate identification by those that have knowledge of the frames and types of markings.

A media work, such as a movie with markings, is released or distributed in some fashion whether it is shown in movie theaters, distributed over the Internet, broadcasting channels, cable network, or distributed by a digital medium such as a DVD 10. These works may represent millions of dollars of effort and expense to bring the work to the public and those involved in the process wish to recoup their investment. If the industry is unable to maintain pricing and demonstrate economic feasibility, such works will not continue to be generated.

While many public members legitimately obtain copies of the work in a proper fashion, there are others that do not, and improper copies of the work are generated 15. The improper copies can be copies of a DVD that have been ripped from the original. In some cases, individuals videotape legitimate showings of a movie such as in a theater, pre-screening, pay-per view or other public displays, thereby creating an unauthorized copy. In still other situations, legitimate copies are procured in a digital format that is then subject to improper copying and distribution.

These improper copies are then distributed 30 without authorization, such as being uploaded to the Internet where the copies proliferate to multiple end-users either free of charge or even for a fee payable to the party misappropriating the work. The improper copies can also be recorded onto recordable media and sold or distributed by unauthorized parties.

In order to curtail these practices, the content owners and those harmed by the improper copying/distribution make attempts at identifying the improper copies and determine where the content was acquired. Once a suspect copy of a work is obtained, manual processing 40 is performed to detect forensic cues to identify whether the copy is improper. This information, if timely, can sometimes be used to help identify the source of the improper copy. The manual processing is labor intensive, is performed by skilled technicians and takes time to obtain an appropriate level of confidence. There are numerous efforts underway to prohibit the copying itself while allowing legitimate users fair-use of content they have acquired appropriately. Eventually, these efforts may reduce illegal copying and distribution, but those that are involved in the improper copying continue to find ways around the prohibitions.

There have been some attempts to help curtail the improper copying and distribution and its associated harm. Various mark embedding technologies have been used including visible markings and invisible markings. Some attempts have also been made towards automating the forensic mark detection including the detection of the embedded marks as well as those markings that occur as a result of the copying. There is continued need for more efficient processing that requires less manual labor and can be performed in a more timely manner while still being able to maintain an appropriate level of confidence in the identification process.

BRIEF DESCRIPTION OF THE INVENTION

The system and methods described herein relates generally to forensics of media works and more particularly to the detection of digital works improperly copied and/or distributed.

One embodiment is a method for identifying a source of a copied work, comprising obtaining at least some portions of a reference work, collecting at least some portions of the copied work, matching the copied work with the reference work, and detecting forensic marks in the copied work by spatiotemporal matching with the reference work. The matching in one aspect comprises, temporally aligning one or more sequences of the reference work and the copied work, and spatially aligning sequences of the reference work and the copied work. The method can be automated and/or semi-automated.

The method further comprises loading a plurality of the reference and copied works into a database. The titles of the reference and copied works can be automatically identified by a fingerprinting system or manually assigned.

In one aspect, the method further comprises extracting low-level image features from the sequences. The works can be temporally aligned through scene change detection and phase correlation of the low-level features. The low-level features can be at least one of color histogram change, Minkowski distance and histogram intersection.

The works can be spatially aligned through minimization of the disjoint information, maximization of the mutual information, or optimization of other metrics.

The forensic cues can be detected by normalized correlation in a spatial domain, normalized correlation of temporal profiles, edge detection or weighting the visibility of the forensic cues as defined in the reference work.

The similarity score between a suspect work and reference work can be calculated by combining similarity scores from individual forensic cues or by combining similarity scores from multiple forensic cue frame locations.

A further embodiment is a system for automated forensic detection of digital works, comprising at least one reference work, at least one suspect work, an alignment section that performs temporal alignment and spatial registration between the reference work and the suspect work to produce a mapping of the reference work to the coordinate system of the suspect work, and a mark detection section for processing the mapped work and suspect work to calculate a similarity score between the suspect work and the reference work, wherein the alignment section and the mark detection section are computer programs operable on a computing device. The mark detection section performs at least one of patch correlation, temporal correlation, frame shift limiting, mark visibility weighting, edge detection, and frame scoring.

The method may include temporally aligning one or more sequences of the reference work and the copied work including calculating initial target frames, extracting video snippets around the frames with mark insertions, computing feature vectors, normalizing a sampling rate, and computing offset and quality indicators through phase correlation. In addition, calculating the initial target frames can comprise processing using a linear model based on the frame rates.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5a-5c graphically shows temporal alignment processing in accordance with one embodiment.

FIG. 9 is a user interface screen that illustrates the analytical results of the forensic analysis in one embodiment.

FIG. 10a-10d shows some of the types of marks processed for forensics.

DETAILED DESCRIPTION

Figure 1:
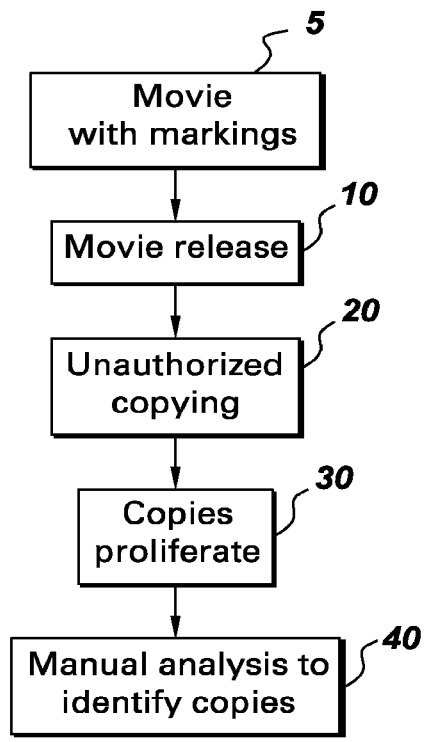
FIG. 1 is a prior art diagram of content analysis processing.

As noted, there is a need to curtail and prevent the abusive practices that lead to unauthorized copies of media works being distributed. The systems and methods detailed herein provides for mark detection and processing to help identify the source of a copied work. One aspect includes tracing the source of misappropriated and improperly distributed media works. Some of the benefits of the system are to protect the public from higher costs for legitimate copies, ensure proper compensation to the parties originating the work, and ensure the integrity of the work.

The systems and methods herein improve the effectiveness of anti-piracy operations that are tasked with identifying sources associated with copied works such as movies. One aspect compares copied content to an existing set of reference content. In one aspect, each improper copy is entered into the system and a score is generated indicating the likelihood of a match between the copied content and the existing reference sources. Scoring enables improper copies to be grouped in various ways, such as by distribution channels, which gives improved assessment of the impact and pervasiveness of improper copying at many levels. This information is used to develop mitigation strategies including investigations of particular leaks and leakage points. Automating or semi-automating this task permits more copies to be processed in shorter time, enabling faster initiation of counter measures.

Certain works have embedded forensic marks which can provide, for example, unique movie release information, and a unique identification of the forensic marks can be used to track down the source of improper distribution. The forensic cues can be imparted deliberately into one or more frames, intrinsic media features, or can be artifacts of copying that can be used to uniquely identify a particular work that is distributed to a store, geographical location, website or movie theater. Certain copy protection technologies can incorporate marks during the copying process and also during the display, including selective incorporation of the marks that can be used, for example, when deploying "one-time copy" works. There may be multiple marks and/or multiple frames with forensic cues to accurately identify a suspect copy as originating from a particular source. Such forensic marks can be almost invisible at normal play back speed. The visibility on individual frames is subject to local contrast, but normally quite distinctive. The mark embedding is repeated at a number of isolated places in a video work, called mark insertions. A plurality of marks can be inserted in individual frames or collection of frames to enhance identification such that the marks can identify features such as frame number and time code to identify works. The format, size, shape, typography, symbology, occurrence, placement, visibility, and relative relationship vary depending on the type of content being marked, the type of distribution medium the on which the content is being distributed, the forensic intent, and method of extraction of the forensic information. Forensic marks may be used to identify such features as the origin of the illicit copy by specific distribution medium, distribution channel, distribution window, distributor, distributor location, recipient group, or individual recipient. Unintentional forensic cues can include, but are not limited to, elements of a specific screening event such as audience interaction, film dirt, hair, projector defects or anomalies, screen defects or anomalies. Other unintentional forensic cues can include anomalies from audio/video captures that are analog to digital, digital to analog, analog to analog, and digital to digital. Attacks on or modification of the original content may also become unintentional forensic cues themselves.

One of the difficulties in combating the improper copying and distribution of digital works is verifying that a given set of forensic marks on a suspect copy are the same marks that appear on a reference work. The task of identifying misappropriated digital works is complicated by a number of factors, making direct comparison on selected frames difficult. Such challenging factors include data size, video-to-video variation, and image quality. For example, the encoding data size typically refers to locating a few frames with forensic marks in a video work having tens of thousands or hundreds of thousands of frames. Video-to-video variation refers to the many differences that can be attributed to improper copies. There are large varieties of transcoding, such as spatial resolution, frame aspect ratio, frame cropping, frame decoration, temporal frame rate, compression codec, I, B, and P frame configuration, and compression ratio. Furthermore, the video content may change, such as the removal of scenes or opening/closing credits. The misappropriated video work may be recorded and shot at an oblique angle that may also include audience interaction. Color and appearance may undergo dramatic changes and logos and captions may be added that obscure marks.

The image quality may also be dramatically degraded on improper copies of videos making content analysis and detection difficult. Copies that are ripped tend to have some transcoding to put the copied work in the desired format. Ripping refers to the copying of digital works from a source, such as a DVD, onto a hard drive or another storage medium. This tends to be a lossless and exact copy of the original work and there are a number of products and software used to facilitate such copying as it may or may not be legitimate. Sometimes ripping or copying the original work may introduce compression techniques that are not lossless introducing additional challenges for retrieving forensic features. At low image resolution the marks can sometimes be obscured, and under aggressive compression, subtle details can disappear or otherwise blur the marks. There can also be blocky artifacts that result in false information.

A further difficulty in matching a suspect copy of a digital work to a reference copy is that the content may be changed to such an extent that the forensic marks cannot easily be verified. The same work can be released in different regions and target markets with different credit information. More commonly, unauthorized copies of works may have the credit information at the beginning and the end cut off, introducing a global shift between works, thereby introducing movie credit variation. To fit a video, particularly a movie, into multiple discs, sometimes the work is split into multiple files, each with a few extra frames at the end due to coding constraints, introducing local temporal shift. In addition, those that are involved in improper copying and distribution may identify the forensic marks and edit them out by dropping and shuffling frames, sometimes referred to as counterattack editing.

One embodiment describes a method and system for identifying forensic marks that is robust to many of the difficulties described herein. In particular, it matches sections of the work temporally and spatially to account for transformations that may have been applied. It uses a variety of detection comparators and variations to better differentiate between the forensic cues within media works.

Figure 2:
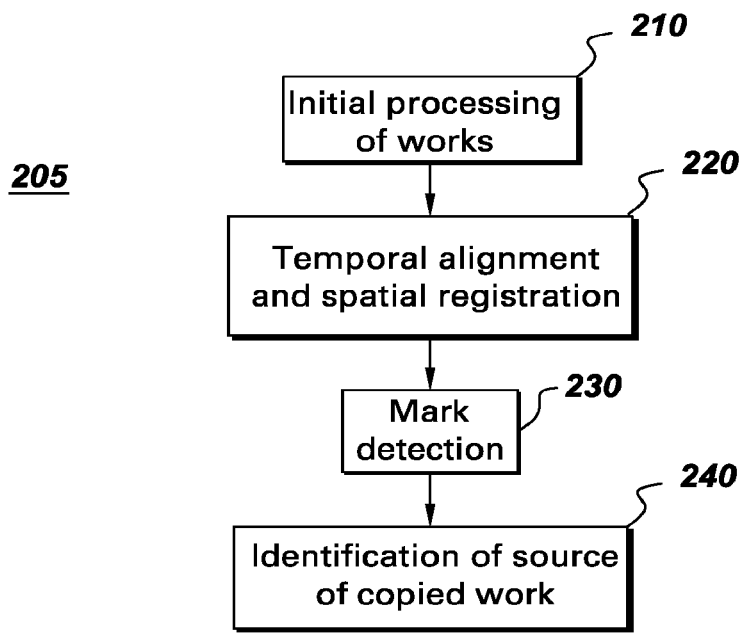
FIG. 2 is a basic flowchart of system processing configured in accordance with one embodiment.

Referring to FIG. 2, a high level process flow 205 of one example of the forensic system is depicted. Reference works and copied works are collected and subject to some initial processing of the reference works and the suspect copies 210 to put the works in a usable format for the subsequent analysis.

The initial processing 210 can include video decoding so that subsequent steps may process the video more efficiently. In another embodiment, any decoding known to those in the art may be performed as needed. Decoded data may be cached for subsequent reuse. There are a number of control parameters that can be implemented to initially format or otherwise prepare the suspect work. For example, if the work arrives as a directory of datafiles, such as from a P2P (Peer to Peer) download, the files can be reassembled by some name matching and reassembled according to the design criteria. Such initial processing ensures that the subsequent processing is performed in an optimal manner.

For example, in a video work, the pre-processing refers to establishing a video interface to read the video frames and, if needed, transcode to a standard video format. Transcoding refers to some form of digital-to-digital conversion from one format or state to another. The present standards support a variety of spatial resolution, including HD, DVD, and VCD resolutions. Change of the spatial resolutions involves changes of spatial scaling factors and different handling of the frame borders. In order to appreciate the pre-processing, some basic description of one video coding is provided for illustrative purposes. By way of illustration of one example, a digital video is a temporally varying spatial signal with extremely high space complexity. A video at DVD (Digital Versatile Disc) resolution (720×480) has a bit rate of more than 200 Mbits per second. Therefore, movie-length videos (hour plus) are almost always compressed to remove spatiotemporal and coding redundancy. Most video streams follow certain coding profiles, in terms of variables such as frame rate, spatial resolution, and bit rate. The popular frame rates are 24, 25, and 29.97, wherein movies are usually shot at 24 frames per second (fps). The differences between the various standards demonstrate the difficulties in the processing and some of the standards are detailed. The National Television System Committee (NTSC) standard currently used in USA and Japan specifies 29.97 fps, and the Phase Alternation Line (PAL) standard used in Europe and China specifies 25 fps. The DVD specification allows a spatial resolution of 720×480, and the VCD specification uses spatial resolutions of 352 or 340×240. There are a number of file formats such as avi, mpeg, Xvid, and Quicktime, however formats are subject to change as new technology is adopted. The large variety of video codecs, standards, and specifications pose a great challenge to proper decoding.

The initial processing 210 may include running some file verification such as checksums to identify whether it is an identical match to a file already known in the system. If it is the first time the work has been obtained, the video content is generally annotated to identify the forensic marks. It should be understood that the more forensic marks that are detected in the work, the greater the certainty that the work originated from a particular source of the copying. The entertainment industry may place marks such that a particular work can be identified to a particular store and geographic region. Alternatively, the markings may be able to identify a particular movie theater that displayed the work.

Each reference work uses annotation that describes a set of ground truth information describing the forensic features that uniquely identify the work. One embodiment is to create an additional file that describes the forensic marks. Another embodiment is to store the description in a database. Forensic mark descriptions may include one or more of the following attributes: frame where the mark is located, coordinate locations within the frame, the type of mark, the size of the mark, the number of frames that the mark appears on, and the visibility of the mark. The type of mark may indicate a particular shape, distributor, and intentional or unintentional feature. One skilled in the art will recognize that there are many variations to represent these attributes.

Referring again to FIG. 2, the temporal alignment and spatial registration processing 220 uses predefined information (ground truth) from the reference to determine where in the suspect copy to search for forensic marks. Temporal alignment is used to locate any temporal shift between reference works and copy works. There are a number of different techniques and algorithms known in the art that can be utilized for the temporal alignment and some are detailed herein. In general terms, the temporal alignment performs a verification and adjustment of frame rates. Spatial alignment or registration according to one embodiment registers frames and/or image sequences/volumes, wherein the frames are spatially registered into the same coordinate system. Spatially aligning the corresponding frames can facilitate the mark detection by limiting the area in the image to search for marks.

The processing includes mark detection 230 that seeks to identify marks on the reference work in relation to the suspect copy. In one embodiment, mark detection is based on the correlation of image regions in corresponding works with a mark template or region. The mark detection processing 230 is used to assess the likelihood that a suspect copy originated from a particular reference work. Mark detection in one embodiment includes image pre-processing and enhancement that may include mark detection by normalized cross-correlation, spatial verification of mark constellation, temporal filtering and/or edge detection to authenticate consistent marks. Limiting the search to a minimal set of frames and restricted spatial area within the video frames is helpful to avoid misidentifying other artifacts of the video work as the forensic cues. The scores of a suspect copy versus one or more references are examined.

If a match is determined, the suspect work is assigned the source attributes of the reference work 240. If no match is determined, the suspect is identified as a new reference and the ground truth information and source attributes are created and stored. Based on the system processing of a suspect copy to a reference work, the source of the copied work may be identified 240. The reference work can be a previous improperly copied work that gets analyzed and recorded into the system database. The reference work can also be a pre-identified original work from the original source that is entered into the system so that subsequent copies can be tracked. Identifying a common source for improperly copied works allows for planning and resource allocation as appropriate. For example, identifying a first improper copy of a newly released movie can be placed into the system along with as much identifying data as can be obtained. Locating subsequent copies allows for grouping of the improper copies to determine whether it represents a significant problem. Such grouping also can provide further identification information about the copies and may allow for traceability to the origin of the copying.

Figure 3:
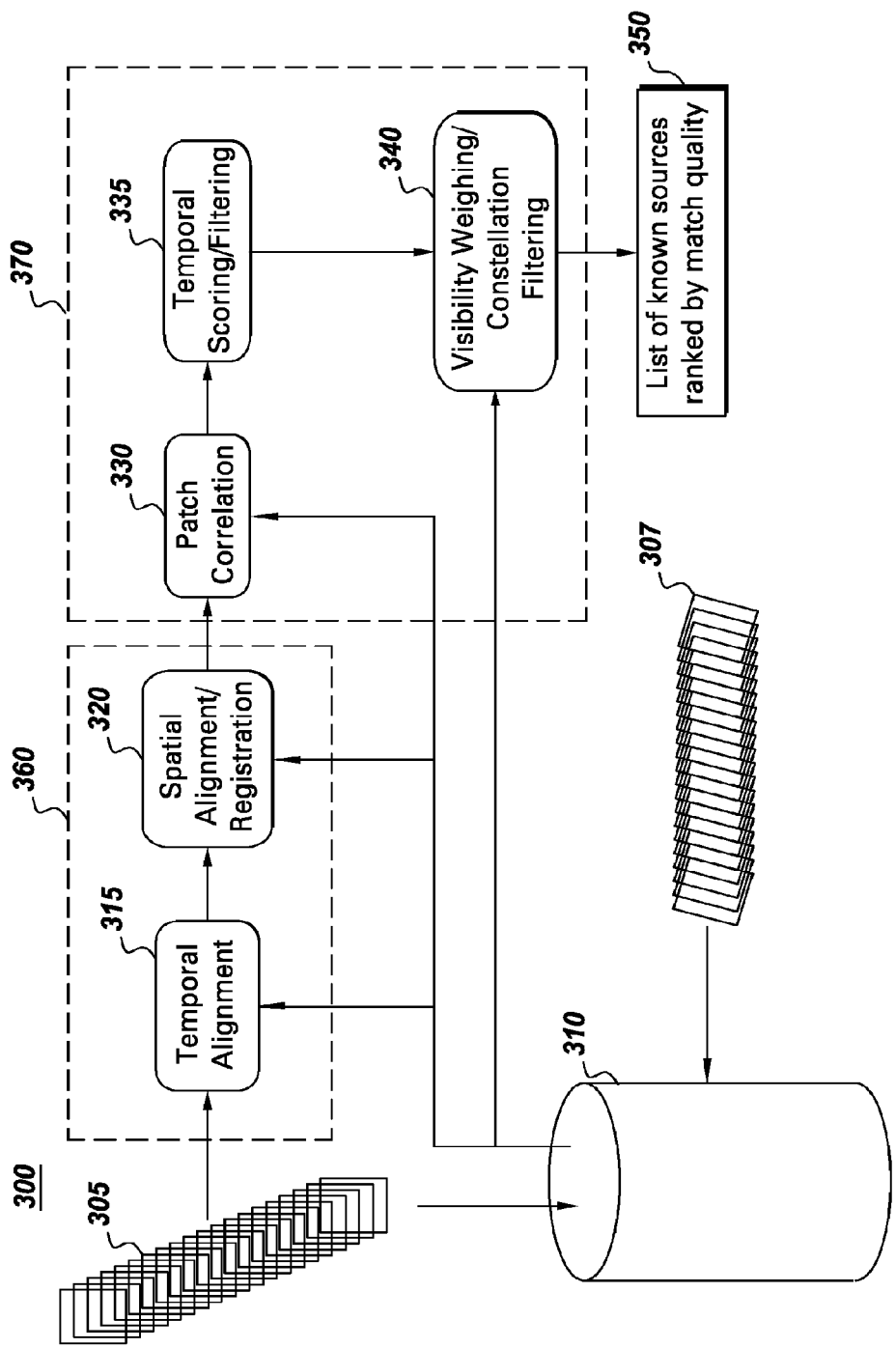
FIG. 3 is a basic system block diagram for forensic analysis configured in accordance with one embodiment.

Referring to FIG. 3, a basic diagrammatic illustration for a system 300 to aid in the battle against improper copying of media works is presented in accordance with one embodiment. The suspect works 305 and reference works 307 are collected and subject to pre-processing. These works can be digital media such as CDs, DVDs, tapes as well as digital files and clips that are distributed over the Internet by peer-to-peer, email, and website downloads. The works may represent a short time interval wherein the works are gathered at one time or within a short time period. The works can also be accumulated over time creating a repository of materials. In some examples the works can come from a variety of dates, locations, and sources. For explanatory purposes, the description herein focuses on movies as the works, but the system is not limited to movies and extends to other media works.

The suspect 305 and reference copy 307 may be stored on a storage medium 310 that can be a server or other type of database storage. The system processing includes an analysis section 360 that is used to compare the suspect work 305 to various reference works 307, assess the degree of similarity and place the suspect copy in better condition for subsequent processing. The analysis section 360 includes a temporal alignment section 315 and a spatial alignment or registration section 320. For temporal alignment 315, feature vectors in one embodiment are aligned, such as by phase correlation, thus finding the corresponding frames between the reference work and the suspect copy. In spatial alignment/registration 320, frames are spatially registered into the same coordinate system by a transform, such as an affine transform.

The temporal misalignment between a reference work 307 and suspect copies 305 can be due to a number of factors, such as frame rate, movie credit variation, splitting of files and counterattack editing. As an example of frame rate, if video content from two copies of a video work is coded at different frame rates, then the same time code points at different frame numbers is based on $k=t*f_r$, where k is the frame number, $f_r$ is the frame rate per second, and t is the time code. This discrepancy can be adjusted or compensated such as by resampling of the frames or feature vectors.

In one embodiment video works files are decoded and low-level feature vectors are extracted. In another embodiment, the feature vector extraction is enhanced by caching the computed features, which is particularly helpful for the reference work, as the features are only computed once. In an additional embodiment, an additional shift to represent differences at the start of the work may be determined.

After temporal alignment, spatially aligning the corresponding frames can facilitate the forensic mark detection and is accomplished by the spatial registration section 320. A number of factors may contribute to the spatial misalignment such as aspect ratio change, transcoding, editing and camcorder copying. The aspect ratio change refers to differences between the aspect ratios of the reference work and the suspect work. Most display devices have a width/height aspect ratio of 4:3, however high definition displays also support 16:9. In some copies, the image frames are cropped or padded with black margins to make the conversion and this can make the alignment more difficult. In the digital perspective, some of the transformations may include nonstandard aspect ratios as well. Cropping may be performed to eliminate features, such as unintentional audience interaction captured during illegal recording or boundaries of the image introduced by a recording angle.

The video frames may be scaled and edited to support frame decoration and captions. Such editing can be a deliberate effort to elude detection or merely inadvertent processing to accommodate the desired output for the copied work.

When a media work is copied by a camcorder, such as in a movie theater, the capture condition and settings are typically not well-controlled, and there may be a perspective distortion due to the oblique viewing angle. Some of the parties who are making additional unauthorized copies of the work may crop the video image region to eliminate artifacts in the image introduced by the viewing angle during the cam-cording and add padding to the perimeter (typically top and bottom) of the images. The padding may appear as borders, frequently black, but also other colors or backgrounds. There may also be camera motion, such as panning and jittering. There are a number of spatial alignment algorithms that can be used to compensate for certain spatial misalignment issues.

After the analysis section 360 has aligned the suspect copy to the reference work in temporal and spatial dimensions, the system 300 proceeds to a detection section 370 used for detecting if the forensic marks also appear on the suspect copy 305, therefore making inferences based on the knowledge collected on the reference work 307. An incoming suspect copy 305 is normally compared to a set of unique sources to determine if it is improperly copied from a known source or itself is a unique source. In the mark detection module 370, the forensic marks on the reference works 307 are matched to those of the suspect copy 305 and detection scores are reported.

In more particular detail, the mark detection section 370 in this embodiment includes a patch correlation section 330 that identifies locations in the frame for subsequent processing. A template patch is extracted from the neighboring pixels around each forensic mark on the reference frame. The temporal patch contains unique spatial texture information, and is matched against a search region on the test frame after spatiotemporal alignment. A similarity or distance score is computed between the template patch and a test patch inside the search region. One particular distance measure is the normalized correlation. A high score indicates these two patches have similar texture. After computing the distance scores for each patch inside the search region, the maximal score is calculated as the region score and the corresponding patch is localized. The process is repeated for all the forensic marks and all the mark insertions on the reference work and the matching test frames on the copied work.

The processing includes a scoring/filtering section 335 and a weighting section 340 that is used to rank the comparisons. Some forensic marks have a specific temporal profile. For example, certain marks are inserted on several consecutive frames, i.e. the marks are turned on for several frames and then turned off. Such a unique off-on-off temporal profile is very effective to separate the matches and non-matches. To this end, the ground truth temporal profile is created from the reference work, and matched against the computed temporal profile on the copied work. A strong correlation between the temporal profiles indicates a high probability of detection. The spatiotemporal correlation scores are further weighted based on the visibility and mark quality on the reference work, to enhance the strong and unique marks and suppress the faint and blurry marks with low contrast.

Finally, the system 300 generates a list of the reference works that were matched to the suspect copy and there is a score associated with each reference work indicating the likelihood that the reference work was the source of the suspect copy 350. The scores are compared to a prespecified threshold for detection decision.

The system includes the hardware components and network infrastructure that provide the computing capability and communication between the components and to users. In one embodiment, the hardware includes input devices and computing device(s) for processing the input data and preparing the reference works and suspect copy works that are stored on storage devices. For example the input devices typically includes media disc drives and memory storage device access as well as Internet access, network access, and wireless access. There are computing device(s) for performing the processing detailed herein as well as input/output devices including displays to a user.

Figure 4:
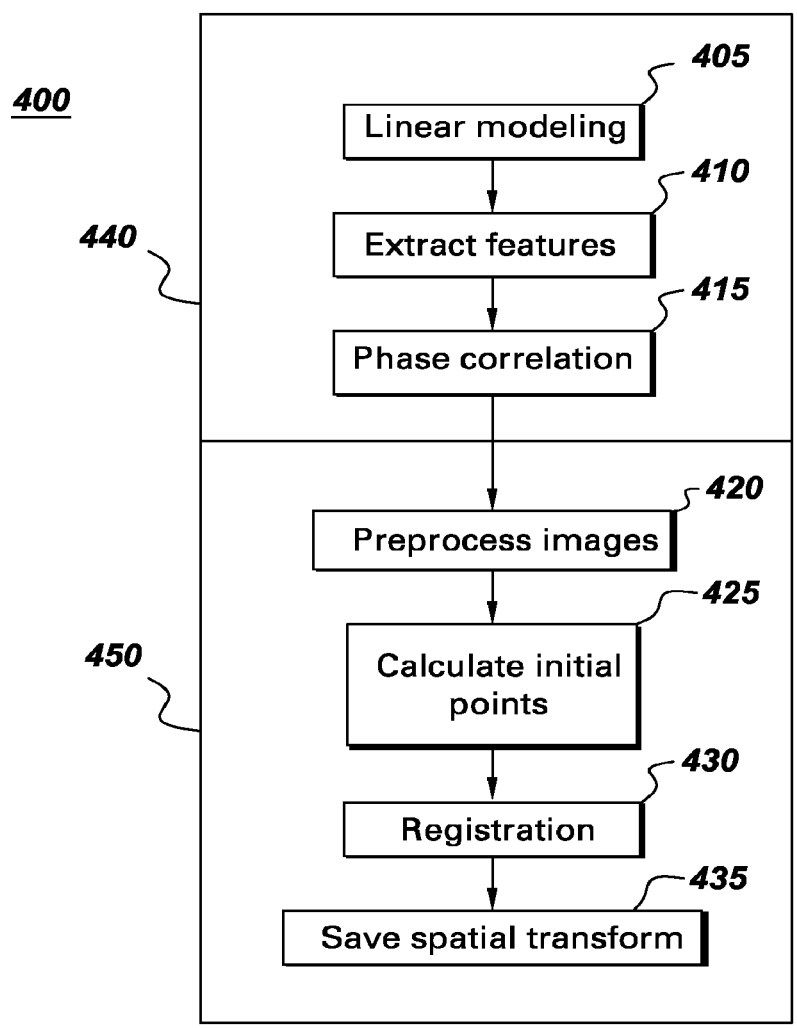
FIG. 4 illustrates temporal alignments and spatial registration aspects in accordance with one embodiment.

Referring to FIG. 4, a further description of temporal alignment and spatial registration is depicted. According to one embodiment, the temporal alignment section 440 includes at least some frame relationship processing that may include linear modeling 405, feature extraction 410 and phase correlation 415. The spatial registration section 450 includes preprocessing of the images 420 from the reference and suspect works, calculating initial transform parameters 425 that are used as input to the registration process 430, executing the registration process 430 and saving the output transformation 435.

In one embodiment the system 400 adjusts for temporal differences using a temporal alignment process 440. In one example, an initial estimate for the location of the forensic cues in the suspect copy is calculated based on a linear model 405 using the frame rates of the two copies. If an initial offset between the starting points of the works has been determined, this offset is incorporated into the linear model 405. However, due to potential differences, this estimate can be off by many frames, so additional processing may be required. Also, many digital copies of works, such as movies, consist of multiple files and may be assembled into multiple discs due to the limitations on the disc file size. The system in one aspect accounts for the file boundaries such as by using indexes. In one example, two indexes are utilized, a global absolute frame number index and a local relative frame index. The relative index refers to the specific video work file and offset frame index. The absolute frame number index is used to convert locations between ripped copies where the file boundaries and/or number of files may differ. The frame indexes may also be converted to time stamps based on video frame rate. Such indexing convention ensures that the correct image content is retrieved.

According to one embodiment, the linear modeling 405 is a piecewise linear model that is used to relate the frame number between the reference and suspect copy. For example, for a specific frame in the reference work $k_{ref}$, the corresponding frame in the test work $k_{tst}$ is given by the model written as $k_{tst}=r_{tst}/r_{ref}*k_{ref}+\Delta_k+\Delta_{start}$; where $r_{ref}$ and $r_{tst}$ are the frame rates for the reference and test works, respectively, and $\Delta_k$ is the local offset for the frame k that is determined by temporal alignment and $\Delta_{start}$ is the starting offset when it is known (or estimated by 0 when not known).

The unknown local offset variable $\Delta_k$ in the piecewise linear model can be computed by phase correlation from the feature vectors $f^{ref}_k$ and $f^{tst}_k$ (or simply $f_{ref}$ and $f_{tst}$). When the feature vectors of $f^{ref}_k$ and $f^{tst}_k$ are aligned after temporal resampling and phase correlation, frame k in works should be temporally aligned accordingly. Computing the offset variable $\Delta_{start}$ in the piecewise linear model is a special case of this process where the feature vectors $f^{ref}$ and $f^{tst}$ represent the beginning of the two ripped copies. The mark insertion frame information $k_{ref}$ on the reference work is available from the unique rip source annotation, referred to as ground-truth. The feature vector is constructed by extracting a number of frames around the mark insertion, such as from one to four minutes. The feature vector $f^{ref}$ is computed from the extracted snippet. The corresponding frame $k_{tst}$ on the test work is predicted based on the piecewise linear processing with $\Delta_k=0$. A number of frames around predicted frame $k_{tst}$ are extracted, with the same duration of the reference work. Feature vector $f_{tst}$ can be computed in a similar way and resampled to adjust the frame rate difference. In another embodiment, $\Delta_k$ may be calculated based on frame differences at the start of the works.

Referring again to FIG. 4, in one embodiment the low-level image features ($f^{ref}$ and $f^{tst}$) are extracted from both the reference and suspect content 410 as a unique fingerprint in a local neighborhood around the works. The amount of data extracted can vary based on the type of content. However, the length of the extracted data should be sufficient to provide features for performing the alignment. Also, the size should be large enough so that the error from the linear model estimate where $\Delta_k$ is approximated to 0 is contained within the content. For instance if the linear model estimate has errors of 100 frames, then the extracted data should be considerably more than 100 frames to allow the temporal shift, $\Delta_k$, to be detected. In the suspect copy the location of the features is an estimate from the linear model. In a further example used to speed up processing, the video snippets used for feature extraction are converted to gray scale and downsampled to a lower spatial resolution. Temporal alignment in this context is the fine-tuning of the estimate of the frame where the inserted mark is expected to occur. The low level image features are represented as a temporal vector.

In one embodiment, temporal vectors from the reference work and the suspect copy are aligned by performing a phase correlation 415 on the signatures. This can be thought of as matching the peaks in the signature that represent the scene changes.

One of the low-level image features that facilitates the temporal processing is the use of color histogram. For illustrative purposes, let a video work be denoted as $V=\{I_k(i, j)\}$ with frame index k=0, ..., K-1 or $V=\{I_t(i, j)\}$ with time index t. An image frame I(x, y) has intensity or color I at pixel location (x, y), where I is an intensity scalar for gray scale video or RGB color vector for color video with N unique code values, x=0, ..., X-1 and y=0, ..., Y-1 are the x and y coordinates of pixel index.

The color histogram $\{h(n)\}_{n=0}^{N-1}$ is defined as the number of pixels having intensity/color code value of h(n)=X*Y*Probability $\{I(x, y)=n\}$, for x=0, ..., X-1, y=0, ..., Y-1, and n=0, ..., N-1. The color histogram is largely invariant to the changes of image resolution, quantization levels, and viewing angle. The temporal evolution of color histograms captures the unique temporal signature of a video sequence. According to one embodiment, the feature used is the difference of color histograms between adjacent frames $f_0=0$, $f_k=D(h_k-h_{k-1})$, where D is the distance function and feature $f_k$ is 0 or small for stationary or slowly changing scenes, and a few isolated high peaks for scene changes and shot boundaries. The distance function D can be expresses in several ways such as the histogram intersection or Minkowski distance. Histogram intersection is typically between two color histograms $h^1$ and $h^2$ and can be defined as:

$$D_{int}(h^1-h^2) = 1 - \frac{1}{N}\sum_{n=0}^{N-1} \min(h^1(n), h^2(n))$$

It returns a value in [0, 1], with large values indicating a large difference. The Minkowski distance of order p between two color histograms is defined as:

$$D_{min}(h^1-h^2) = \left(\sum_{n=0}^{N-1}(h^1(n)-h^2(n))^P\right)^{1/P}$$

Examples of histogram differences show video signatures with very distinctive patterns, with spikes corresponding to the scene change boundaries. An example of a color histogram signature from a selected work is shown in FIG. 5. According to one embodiment, this allows for improved feature extraction. Other robust features and similarity metrics can be used as well by those skilled in the art.

Phase correlation 415 is a frequency domain method to determine the relative shift between two feature vectors, $f_{ref}$ and $f_{tst}$. The feature vectors are mapped to the frequency domain by Fast Fourier Transform (FFT), $F_{ref}=F[f_{ref}]$ and $F_{tst}=F[f_{tst}]$.

The normalized cross power spectrum (CPS) is computed as $$CPS = \frac{F_{ref} F_{tst}}{|F_{ref} \cdot F_{tst}^*|}$$

where * denotes a complex conjugate.

The inverse Fourier transform of the normalized cross power spectrum, $$v = F^{-1}\left(\frac{F_{ref} F_{tst}}{|F_{ref} \cdot F_{tst}^*|}\right)$$

gives the correlation subject phase shift, where the amplitude is normalized by the denominator.

The phase shift $\Delta$ yielding the peak correlation $\Delta = \arg\max_n v(n)$ is the offset solution in the piecewise linear model where n is the vector index or frame number (within the snippet). This model assumes that v is a periodic signal, so $\Delta$ at both ends have small offset with opposite signs and $\Delta$ at the middle indicates the largest offset.

In addition, a temporal alignment quality indicator is introduced, wherein $S_{temp}=1-v_2/v_1$ where $v_1$ and $v_2$ are the highest peak and second highest peak of vector v, assuming $v_2$ is outside the neighborhood of $v_1$. It is a value between [0, 1]. When $f^{ref}$ and $f^{tst}$ are well-aligned, vector v has one unique spike and $S_{temp}$ is close to 1. Otherwise, there is no dominant peak in v and $S_{temp}$ has a low score. In one embodiment, observation of a low quality indicator can be used to reevaluate other inputs such as the frame rate, the down sampling of the resolution to create the feature vector or other inputs the temporal alignment process. In another embodiment, low quality indicators can be used to minimize the impact of a particular segment on the final verification score.

To this end, the temporal alignment processing 440 in one embodiment can be summarized by calculating initial target frames in the test work using a linear model based on the frame rates; extracting video snippets around the frames with mark insertions; computing feature vectors $f^{ref}$ and $f^{tst}$ (i.e. the difference of color histograms, from the snippets); normalizing the sampling rate of $f^{ref}$ and $f_{tst}$ by temporal resampling; and computing offset $\Delta$ and quality indicators through phase correlation.

There is a spatial registration section 450 that in one embodiment performs processing to align the reference work to the suspect copy, typically on a per-frame basis. Spatial alignment compensates for the spatial misalignment issues by preprocessing images 420, such as image registration and volume registration, that includes metric and image matching functionality. The respective images/volumes from the reference work and copied work are evaluated based on selected metrics and can be used to produce a fitness value. There are spatial registration algorithms that can be used to compensate for certain spatial misalignment issues, such as scaling, cropping, translation and rotation. The registration process 420 takes an image frame or volume from the reference work as the fixed images and the corresponding image frame or volume from the copied work is taken as moving images. The spatial registration process then applies an optimization procedure to improve the fitness value.

In one embodiment, the resolution of the images may be reduced before performing the spatial registration process to reduce execution time. In another embodiment, the spatial registration process may be repeated by using images that are larger than the previous iteration (but still the same or smaller than the original images). When repeating the process, the outputs from the prior execution are used as initial points for the optimization process, adjusted for the change in image dimensions. This iterative strategy can reduce the error in the spatial transform estimation by reducing the emphasis on transforms that are less likely or have smaller ranges. In another embodiment, factors that control the step size of the various parameters in the transformation may be specified. These factors may be varied at different steps in a hierarchical implementation.

During the optimization process of spatial registration, a fitness function is selected to evaluate the transform function. In one embodiment disjoint information is introduced as a metric and image matching function. In another aspect, 2-D image registration algorithms and 3-D volume registration algorithms are used to align two image frames or two sets of image frames. A variety of geometric transforms (including translation, rigid, similarity, and affine) and metric (mutual information, disjoint information, mean-squared error, and normalized correlation) can be wrapped in the processing. Initial parameters and scaling factors are typically passed in for faster convergence.

There are a number of image registration and segmentation algorithms, and an image frame or volume from the reference work can be processed as fixed images. Corresponding image frame or volume from the copied work may be taken as moving images that can be processed such as by an interpolator. In one aspect, the pixels of the various images are utilized. The respective images/volumes from the reference work and copied work are evaluated based on selected metrics and can be used to produce a fitness value. The resulting processing, such as in an optimizer, can be used to update geometric transformations which can be fed back through the interpolator and the process can be repeated until the difference is within an acceptable threshold or there can be a fixed number of iterations.

TABLE 1

Properties of Disjoint Information

| | |
|---|---|
| Self Similarity | $D(A, A) = D(B, B) = 0$ |
| Minimality | $D(A, B) \geq D(A, A)$ |
| Symmetry | $D(A, B) = D(B, A)$ |
| Triangle inequality | $D(A, B) + D(B, C) \geq D(A, C)$ |
| Non-Negativity | $D(A, B) \geq 0$ |
| Boundedness | $D(A, B) \leq H(A, B)$ |
| Independence | $D(A, B) = H(A) + H)B)$ |
| | $\Leftrightarrow p(A, B) = p(A) \cdot p(B)$ |
| Data Processing | $D(A, B) \geq D(A, T(B))$ |

Given two images A and B sampled from image distributions A and B with probability density functions of p(A) and p(B), the disjoint information can be defined as the joint entropy excluding the mutual information $D(A, B)=H(A; B)-I(A, B)=2H(A, B)-H(A-H(B)$ where $H(x)=-\int p(x) \log p(x) dx$ is the entropy of random variable x and $I(A, B)$ is the mutual information defined as $$I(A, B) = H(A0 + H(B) - H(A, B)$$

$$= \int\int p(A, B) \cdot \log \frac{p(A, B)}{p(A) \cdot p(B)} dA dB$$

In one example, mutual information is the Kullback-Leibler divergence of the joint probability density p(A; B) and the independent distribution p(A)·p(B). Accordingly, the disjoint information can be computed from the probability densities as $$D(A, B) = \int\int p(A, b) \cdot \log \frac{p(A) \cdot p(B)}{p^2(A, B)} dAdB$$

Selected properties of disjoint information are listed in Table 1. Disjoint information is closely related to mutual information, and it is possible to derive one from the other. They both measure the statistical dependence and information redundancy of random variables based on information theory, and share some common properties such as non-negativity, boundedness, and symmetry.

Disjoint information may be considered in some respects as the opposite of mutual information. If mutual information is a measure of similarity, then disjoint information is a measure of dissimilarity/distance. Maximizing mutual information is equivalent to minimizing disjoint information if H(A) and H(B) are stable. However, mutual information violates some of the basic metric conditions and generally cannot be used as a metric, which may limit its applicable domains.

In one embodiment the algorithms and parameters are initialized based on prior knowledge for faster convergence. For example, a region of interest (ROI) can be defined that excludes pixels along image borders from computation. For illustrative purpose, consider an image with a ROI that has a border with ⅙ margin such that the ROI covers two thirds of the central portion of an image frame, leaving ⅙ margin on each side. Many copied works have black regions at the borders such that excluding these pixels from computation leads to more robust registration results.

According to one embodiment, the affine transform uses six parameters to capture the geometric mapping from the reference frame to the test frame.

$$\begin{bmatrix} x' \\ y' \end{bmatrix} = \begin{bmatrix} a & b \\ c & d \end{bmatrix} \begin{bmatrix} x \\ y \end{bmatrix} + \begin{bmatrix} e \\ f \end{bmatrix}$$

The scale factors (a, d) are initialized based on the relative video spatial resolutions from the reference and suspect works, $$a = \frac{X_{tst}}{X_{ref}}; d = \frac{Y_{tst}}{Y_{ref}}$$

The translation terms (e, f) can be initialized based on the image centers. The optimization step sizes for each parameter can also be initialized, because the scale factors (a, d), rotation terms (b, c), and translation terms (e, f) have quite different scale factors in the optimization.

Various spatial alignment algorithms can be employed, and in particular, one for image registration 420 and the other for volume registration to calculate initial points 425. The pairwise image registration takes a frame from a reference work as the fixed frame and the corresponding frame from the test work as the moving frame. For faster processing, the input images are downsampled before registration. Iterative optimization is carried out to find the optimal geometric transform and in one embodiment a similarity transform to get a good estimate of the scale factors, and the results are used as a starting point for affine optimization. The same process is repeated for image pairs on different mark insertions. The quality of spatial alignment can be measured by the metric residue at the end of the iterations.

In volume registration processing, frames with mark insertions are stacked up together as volumes for both reference and test works. Assuming a single 2-D affine transform mapping these two volumes, the dimension of the parameter space is much reduced, from 12 to 6, and it converges much faster.

The volume registration processing works satisfactorily, if one single affine transform applies to all frames with mark insertions, which is true for most transcoding and editing. It generates more consistent results, and is more resilient to temporal misalignment.

Image registration quickly adapts to temporal changes that alleviates camera motion, especially for the copied videos shot by camcorders. It is also appropriate for videos with just one insertion.

By way of a spatial alignment example, assuming that there are two images that differ in terms of color appearance, spatial resolution, and image content around borders, regions of interest create one or more frames that enable the spatial alignment. These regions are used during the registration process 430. When the optimization has ended either via convergence or reaching a maximum iteration count, the current spatial transform is saved as step 435. This transform allows the frame images to be "warped" for display purposes. The transform will also be used to convert the patches from the reference image to the coordinate system of the test image for comparisons during the mark detection phase.

In another embodiment, black borders can be detected in the images and eliminated from the images that are used as input for the spatial registration process. Removing the borders can affect calculation of the initial points 425 and the initial scale factors. When borders are removed, then the default region of interest, ROI, may include the majority of the image, providing more data for the spatial registration optimization process.

Figure 5A:
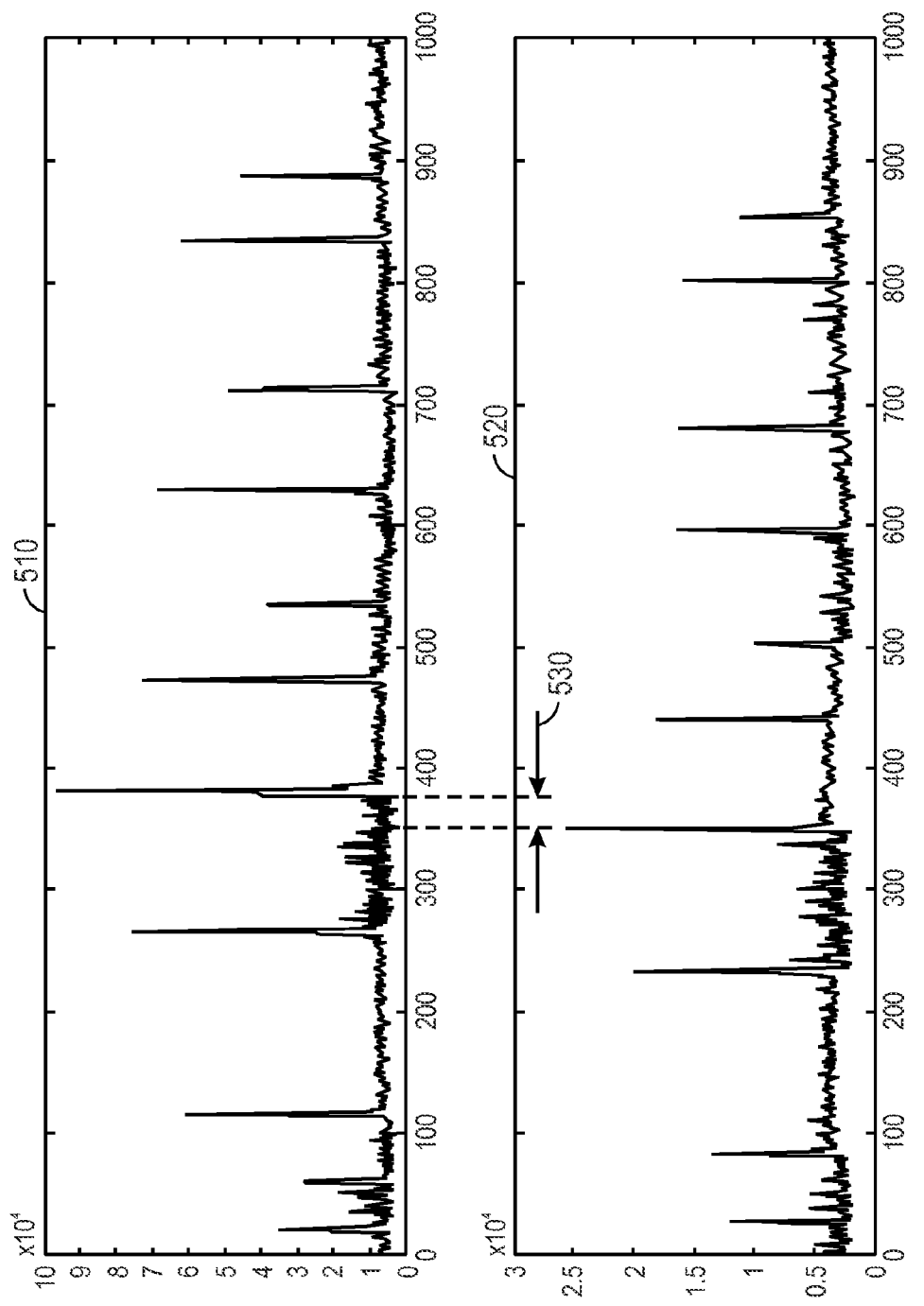

In FIGS. 5a-5c, an illustrative example of the temporal alignment is depicted. FIG. 5a shows the reference vector waveform 510 and the resampled suspect copy waveform 520 representing the vectors before the temporal alignment processing. As noted, there is some frame offset 530 between the peaks of the two graphs.

Referring to FIG. 5b, the reference work 510 and the suspect copy 520 are shown following the temporal alignment shift. As illustrated, the peaks are aligned 540 so that the frames are matched.

FIG. 5c graphically shows the phase correlation with a maximum peak 560 that is equal to 32 frames and represents the required shift that is used to align the frames 510 and 520 from FIGS. 5a and 5b.

Figure 6:
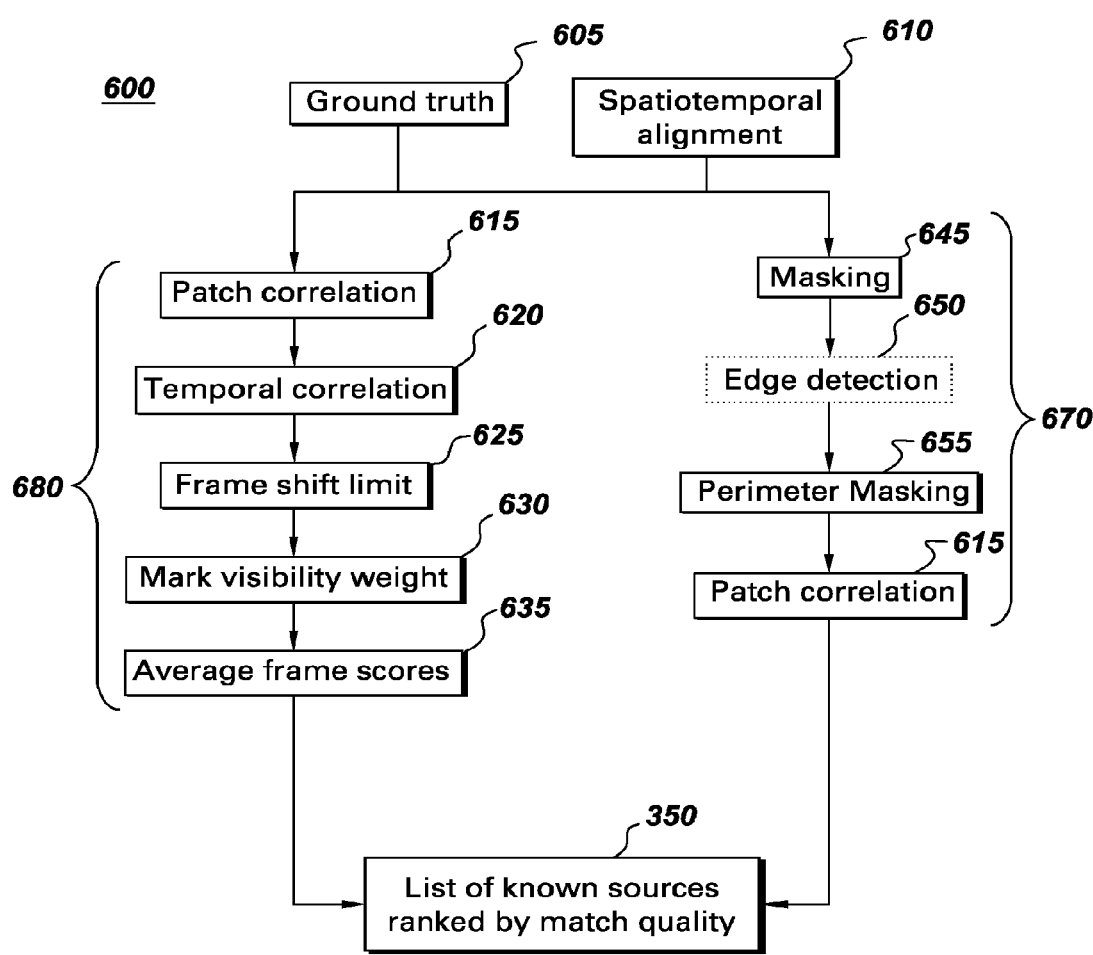
FIG. 6 illustrates mark detection processing in accordance with one embodiment.

Referring to FIG. 6, the processing for mark detection 600 according to one embodiment is depicted. In particular, there is one processing path 680 that includes patch correlation 615, temporal correlation 620, frame shift limit 625, visibility weighting 630 and average frame scores 635. There is another mark detection processing path 670 that includes masking 645, edge detection 650, perimeter masking 655 and patch correlation 615.

To accommodate the mark variation across frames and alignment error, some steps can be taken to verify the forensic marks on a set of adjacent frames and a spatial neighborhood. The verification is typically based on the spatiotemporal correlation 610 of mark groundtruth 605 and spatiotemporal regions around the marks. The spatiotemporal verification model in one example can be summarized as:

$$S_{movie} = \sum_{k=1}^{K} u_k \cdot \max_{s \in (1,\ldots S)} \sum_{m=1}^{M} v_m \cdot \text{temp\_corr}$$

$$(G_j^m, \max_{j \in (f_k+s,\ldots f_k+s+F)} + \{NCC(J_j^m(R(x, y)), I_j^m(x, y))\}$$

where the symbols are defined in the following: I is a patch from the copy frame, including the search ROI; J is a patch from the reference work, containing a forensic mark; R is a geometric (affine) transform mapping (x, y) coordinates from the reference frame to the test frame and is an adjustment from the spatial registration process; NCC computes the normalized cross correlation, in color space without quantization, between the geometrically warped patch J(R (x, y)) and the image patch I(x; y) on the test frame; j is the index of F consecutive frames; $f_k$ is the frame index corresponding to the first frame of the k-th insertion, max of j finds the largest correlation score over F frames; s is the frame index within the temporal search range in mark detection; F is the number of consecutive frames with embedded marks; G is the groundtruth of mark temporal profile over F+# (e.g: 6) frames which should be all 0's except a few 1's or 2's for visible mark insertions and in one embodiment three frames without marks are included before and after the mark insertion; temp_corr computes the correlation between the temporal profile groundtruth G and the normalized correlation scores NCC; $v_m$ is the visibility weight for mark m, 0 for non-visible, and it sums to 1; m is the mark index; summation of m computes the visibility-weighted average of the temporal correlation score for each mark within a mark insertion; $u_k$ is the insertion weight in [0, 1], and it sums to 1; and summation of k returns the insertion-weighted overall video comparison score.

The processing commences with collecting the ground truth information on the reference work, and applying the spatial transformation 610 to map the reference image patches to the coordinate system of the suspect copy. The groundtruth information is usually created only once for each reference work, either manually or by using an automated enhancement. The groundtruth information lists the frames with each mark insertion, the (x, y) coordinate of each mark, the corresponding visibility score [0, 1, 2], and the mark type. The frame correspondence between reference and copy works is typically established by temporal alignment and is stored internally.

From the mark groundtruth 605 on the reference work, the system creates two sets of groundtruth information to compare with the suspect copy, one for spatial template and the other for temporal profile. The spatial template is created for each mark on each image frame by extracting an image patch directly from the reference work. Using the spatial alignment information, the templates are mapped by applying the spatial transformation derived during the spatial registration step to the coordinate system on the test frame. The coordinate locations of the mapping are used to select a search region in the suspect image. In one embodiment, the search region is a fixed size larger than the mapped template from the reference work. In another embodiment, the search region size is calculated as a percentage of the image size. A characteristic of a system calculating the search region size is that it should be large enough so that errors introduced by the spatial registration calculations are negligible during the mark detection calculations for most types of images.

According to one path 680, the transformed groundtruth image patch from the reference work and the search region patch undergo patch correlation 615 to find the best location on each frame within the suspect copy. This process is repeated for each marked frame in the insert. In addition, a mark temporal correlation 620 may be created. The mark temporal correlation 620 is the cross correlation of a mark temporal profile with the patch correlation. The mark temporal profiles define the frames within an insert where the marks appear. In one embodiment, the temporal profile is defined by the visibility weights of each mark, where 0 means no mark or the mark is non-visible, and 1 indicates a partly visible mark, and 2 means a visible mark. For a three-frame configuration, there are many combinations of (2, 2, 2) to (0, 0, 0). The profile for the frames before and after an insertion are set as 0. There is one temporal profile for each mark on each insertion.

Based on the spatiotemporal groundtruth, normalized cross correlation is typically carried out in both spatial and temporal dimensions. The final content analysis produces a normalized mark detection score for each insertion. This is performed for each mark within each insert. The scores for an insert are a combination of the individual mark correlation values and the associated mark temporal correlation values. The frame with the highest correlation score is selected as the best matching frame. The frame selected may be limited to a range defined by a frame shift limit 625. In one embodiment, the mark visibility weight 630 determines the contribution of each mark's correlations and temporal correlations to the insert score. The scores of the inserts combine to provide an overall media score by calculating the average score over the frames 635 within the insert. In other embodiments, various models may be used to combine scores across frames or inserts, including averages, maxima, minima and other variations. The sources are then ranked by the scoring 350.

Figure 7A:
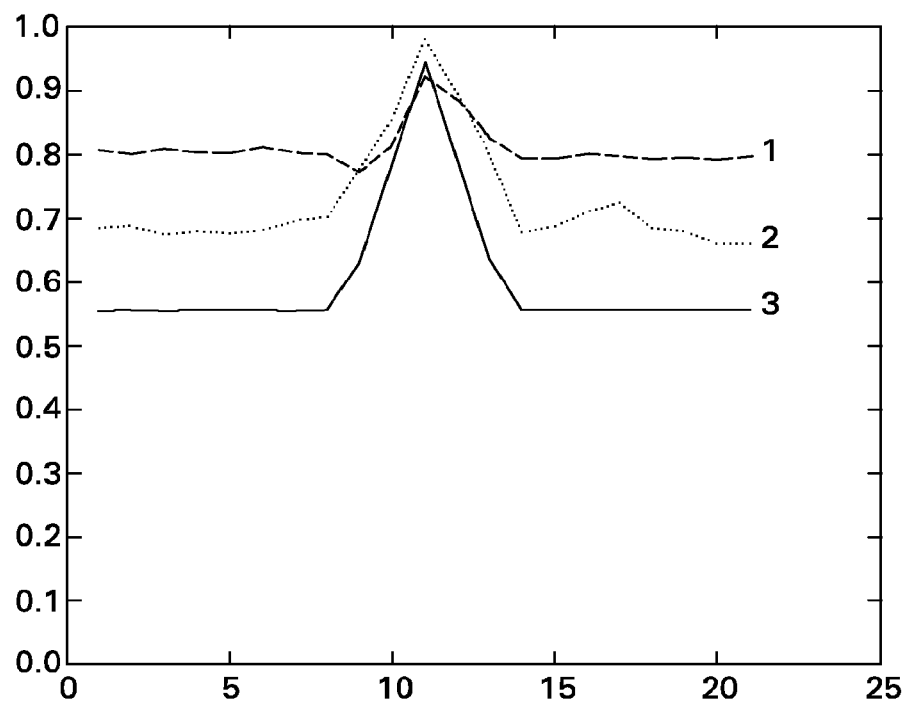
FIG. 7a-7d graphically shows the mark detection analysis in accordance with one embodiment.
Figure 7B:
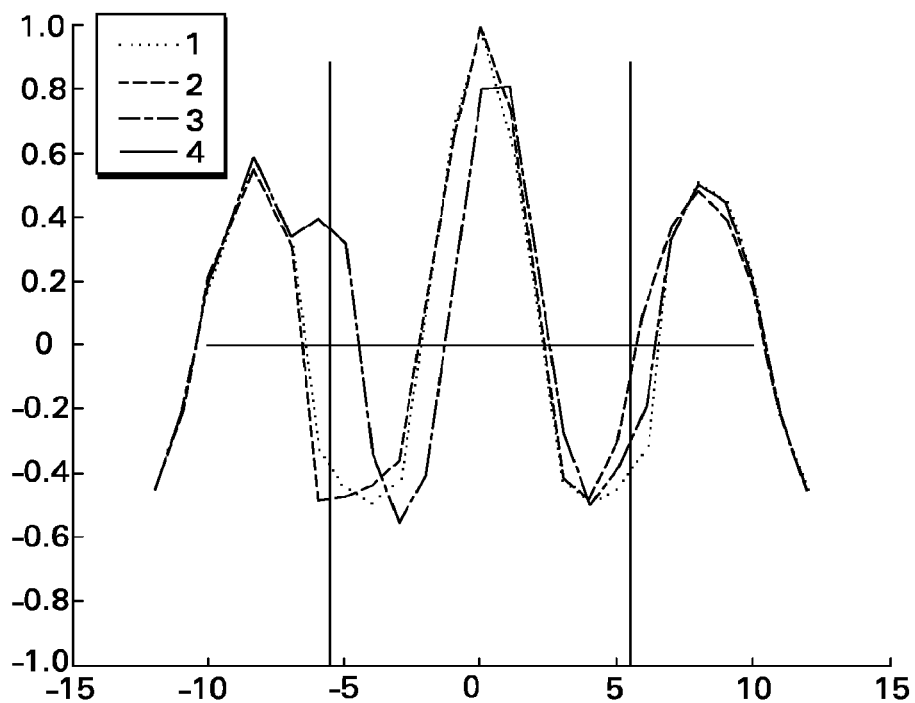
Figure 7C:
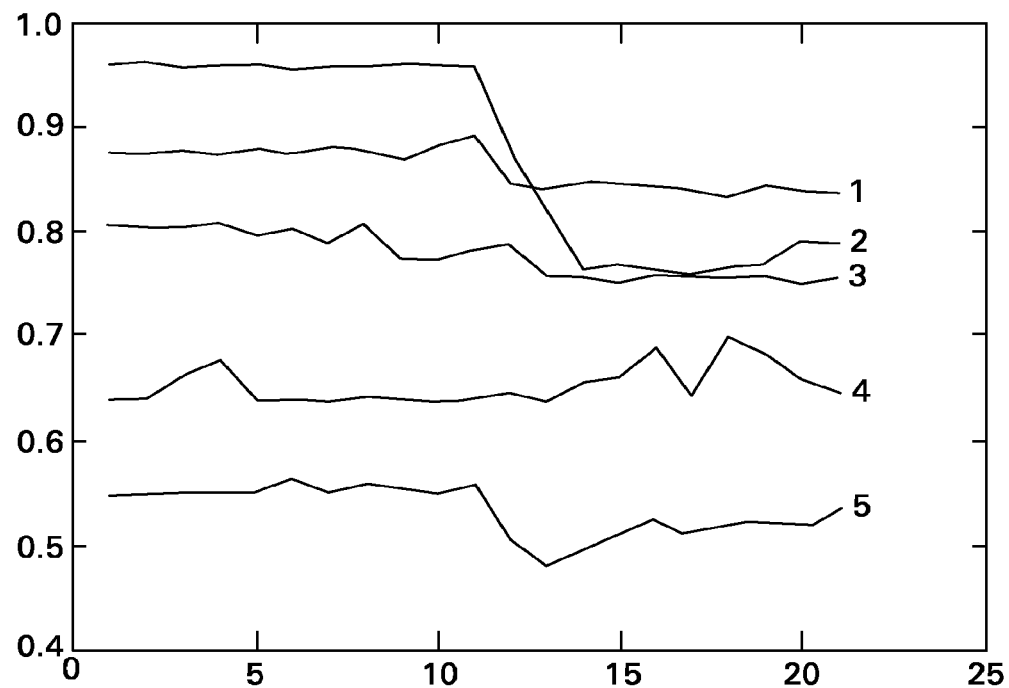
Figure 7D:
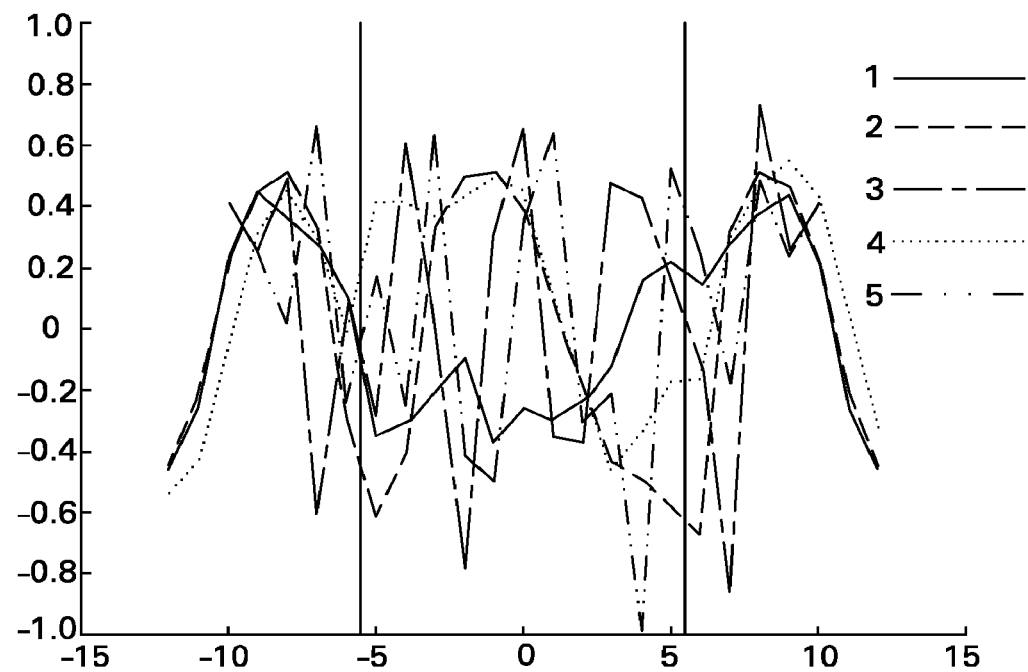

Referring to FIGS. 7a-7d, mark detection matching is depicted in accordance with one embodiment. FIGS. 7a and 7b illustrates the results of a successful mark detection. The correlation index for the peaks is high which depicts the matching for the patch correlation. FIGS. 7c-7d show the results of an unsuccessful mark detection. In FIGS. 7a and 7c, each series in the plot represents the patch correlation for a particular mark over a small set of frames around the estimated target frame identified during the temporal alignment phase. In FIGS. 7b and 7d, each series represent the correlation of the patch correlations with the convolved temporal profile for the same mark. When the mark exists in the suspect copy, then typically, the values peak. This peak indicates the $1^{st}$ frame in suspect copy where the mark insert begins. When the marks are not present, a clear peak among all the series will typically not be seen.

For distinct mark type classes, Receiver Operating Characteristic (ROC) analysis should be performed on a set of copied works. This is accomplished by varying the detection thresholds and calculating detection accuracy and false detection rates. A detection threshold can be selected that yields optimal performance based on business goals and serves as the operational threshold. The business goals are typically a tradeoff between the benefit of higher detection and a given false detection rate. The operating points are then incorporated into the decision process for identifying sources such as illustrated in step 240 of FIG. 2.

Spatial matching determines the probability of a forensic mark appearing on the test frame, through normalized cross correlation between an image patch on the reference frame and a search region on the test frame. Given an image region I(x, y) and a template J(i, j), with i=1, ..., $N_x$, j=1, ..., $N_y$, the normalized cross correlation (Ncc) between I(x, y) and J(i, j) is defined as $$Ncc(x, y) = \frac{(A - B/(N_x N_y))}{\sqrt{C} \cdot \sqrt{D}}$$

$$A = \sum_{i=1}^{N_x} \sum_{j=1}^{N_y} I(x+i, y+j) \cdot J(i, j)$$

$$B = \sum_{i=1}^{N_x} \sum_{j=1}^{N_y} I(x+i, y+j) \cdot J(i, j) \cdot \sum_{i=1}^{N_x} \sum_{j=1}^{N_y} (J(i, j))/N_x N_y$$

$$C = \sum_{i=1}^{N_x} \sum_{j=1}^{N_y} I(x+i, y+j)^2 - J(i, j) \cdot \sum_{i=1}^{N_x} \sum_{j=1}^{N_y} (I(x+i, y+j))^2/N_x N_y$$

$$D = \sum_{i=1}^{N_x} \sum_{j=1}^{N_y} J(i, j)^2 - (\sum_{i=1}^{N_x} \sum_{j=1}^{N_y} (J(i, j)^2)/N_x N_y$$

Spatial matching is carried out directly in color space without preprocessing and quantization. The motivation is to find whatever appeared in the reference work based on the groundtruth information. The fact that a mark only appears on a small number of consecutive frames enforces a strong temporal constraint on mark coordinates. Within a temporal window containing the frames with mark insertions, as determined by temporal alignment, the temporal profile is created for each mark in each mark insertion. In one embodiment, the profile is set as 0, 1 or 2 indicating the visibility level of the mark on the frame.

In one embodiment, an alternative mark detection module is based on the correlation of image regions with a pre-defined mark template. This embodiment assumes marks have uniform template with configurable shape and size. The foreground and background of the binary template indicate the forensic mark and its neighborhood. A constellation structure of marks is maintained, and a persistence score is used to capture the temporal dynamics. The template has a shape such as circular, rectangular, or Gaussian with a pre-specified radius. The size of the template is pre-specified and is independent of the geometric transform. In one example, the image patch is pre-processed, converted from color image to gray scale, and heavily quantized to binary before running normalized correlation.

The whole implementation can be summarized as $$S_{movie} = \frac{1}{K} \sum_{k=1}^{K} \max_{s \in (1, ... S)} \frac{1}{F} \sum_{j=j_k+s}^{f_k+s+F} \frac{1}{M} \sum_{m=1}^{M} \max_{(x,y) \in ROI \cap Persistence} \{NCC(T, I_j^m(x, y))\}$$

where the symbols are defined as follows: I(x; y) is the image intensity value at pixel (x, y). It is pre-processed by color-to-gray conversion, enhancement, and quantization to a limited number of code values; T is a pre-specified binary template, indicating the mark shape and size and is applied to all marks on all frames; NCC is the normalized correlation between template T and an image patch, having a value between [−1, 1]; max operation finds the largest NCC score in a pre-specified ROI while satisfying the persistence constraint; the ROI is selected by averaging the locations of the groundtruth marks and applying the geometric transform obtained from the spatial registration step; M is the number of (visible) marks in an image frame/constellation; average over m finds the mean NCC score of all the marks in a constellation on a particular frame; F is the number of frames involved in the computation before and after the current frame, wherein an insertion lasts F frames; $f_k$ is the frame index corresponding to the first frame of the k-th insertion; average over j finds the mean constellation score over F frames; max operation finds the maximum score within frame search range s; and average over all the mark insertions yields the overall comparison score.

In another embodiment, the mark template can be used to evaluate the quality of the mark in the reference image. This correlation can be used to assign a visibility weight to the mark. In such an embodiment, the visibility weight may be defined on a continuous scale or mapped to integral values.

Referring again to FIG. 6, yet another embodiment of the mark detection is to employ edge detection processing 670 for the processing in the mark detection. Edge detection 650 is an image filtering method used to extract changes in image brightness, wherein such changes typically indicate surface boundaries, contours and/or irregularities within and between objects in the image. There are a number of edge detection operators and several well-known edge detection techniques that can be employed with the present system. Some of the operators include but is not limited to Sobel, Prewitt, Roberts, log, zerocross and Canny. Each of these operators employs a threshold value T that specifies the desired edge sensitivity such that edges that are not stronger than T (or "greater than" in mathematical terms) are ignored.

As mentioned above, a lower threshold increases the sensitivity allowing more edges to be selected. Since certain types of forensic marks appear with low contrast to the surrounding picture, a low threshold may be necessary to select edges that adequately identify the mark. However, as a consequence, more non-mark edges are also selected reducing the effectiveness of mark edges as an identifying feature. In addition, visual distortions in the image (e.g., interlacing caused by film to video conversion) can result in many strong edges having to do with neither the mark nor the picture information.

Special masking and the order of edge detection operations can be used to mitigate the negative effects associated with low thresholds. As noted herein, a mark is a unique identifier for a copy of a work. The terms patches and marks are sometimes used interchangeably herein as the purpose of a patch is to isolate the mark for reasons that include minimizing computational requirements. Comparing marks in certain cases amounts to comparing patches. Finally, the edge detection response to a patch is a binary image, where edges are coded as binary 1 (white pixel), while the background (no edge) is a binary 0 (black pixel); wherein such patches are referred to as edge patches.

For an ideal case, simply to illustrate the processing, if only mark edges are present in the edge patch and the two patches being compared are perfectly aligned spatially without any distortion, it is reasonable to expect a similarity function to exist such that matching edge structures score very high, while non-matching edge structures score very low. For instance, a similarity function can be considered to be the percentage of overlap between the reference edge patch and the suspect edge patch. In reality, many non-mark edges are often present as are misalignments and distortions.

As noted previously, the strength and number of non-mark edges becomes greater with lower and lower thresholds as well as increasing the size of the patch surrounding the mark. Unfortunately, the causes of misalignment and image distortions are deeply rooted in the improper copying process. The effect is such that any similarity function chosen to work on the ideal case would, for the non-ideal case, typically produce a lower score for matched input due to distortion and a higher score for non-match input due to the common non-mark edges. For matched input, non-mark edges and the mark edges are expected to be common between copies as they are, after all, copies of the same source, although there may be some dissimilarity due to alignment and distortion effects. For non-match input, non-mark edges that are expected to be different between the two copies may introduce some similarity because misalignment and distortions may push more edges to overlap.

The use of edge detection processing 650 in the present embodiment seeks to minimize as much of the non-mark information entering the comparison operation as possible. In one embodiment, a mask operator serves to eliminate most of the non-mark information contained in a patch. Specifically, it takes a gray scale image as input and returns only the portion of the input image that resides inside the bounding box of the mark and pixels outside the bounding box are set to gray scale value 0 (black).

The mask operator 645 in one embodiment is performed before application of the edge detection operator. As a result, the edge detection processing produces a sharp edge at the perimeter of the bounding box. Applying a second perimeter mask 655 that is just slightly more selective than the first eliminates this effect. Alternatively, the edge detection operator can be applied before the mask operator in a further embodiment and a second mask may not be needed.

In one example, restricting the information passed to edge detection operator yields less non-mark edges than those obtained by running the edge detection first and then restricting the output. Although incurring a nominally higher computational cost, the former achieves a higher ratio of mark edges to non-mark edges.

The following data, in one example, are inputs to the detection algorithm: reference patch, vertices of the polygon that define the bounding box of the mark contained in the reference patch, and the test patch, which is larger than the reference patch such as by 60 pixels in height and 60 pixels in width.

The system in one embodiment considers all possible ways of matching the reference edge patch to sub-patches in the input test patch. A sub-patch is defined as a subset in the test region that is the same size as the reference patch. Edge detection is performed on each sub-patch creating an edge sub-patch. The system computes the normalized cross-correlation between the reference edge patch and each edge sub-patch and, in the end, selects the edge sub-patch with the greatest NCC value. The output includes the location of the selected edge sub-patch and the NCC value.

In addition, the processing steps may include a first step, wherein a mask is generated from the polygon points that define the reference patch mark. In another embodiment, two masks are generated, one that is applied before edge detection is performed and the other that is applied after edge detection. The mask process is also applied to the sub-patches of the test region.

Figure 8:
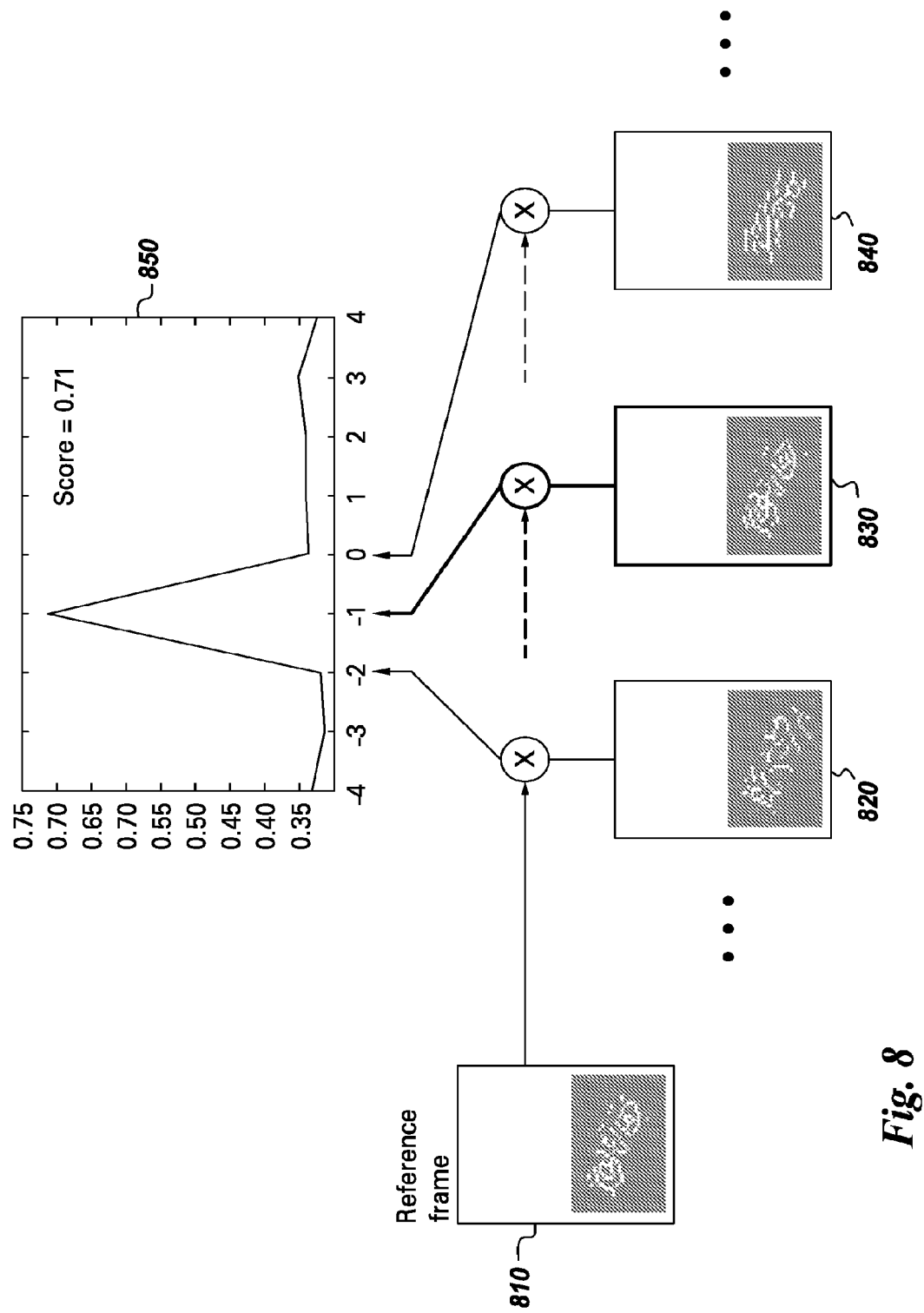
FIG. 8 illustrates edge detection processing in accordance with one embodiment.

Referring to FIG. 8, the edge detection according to one embodiment is depicted visually to aid in a clear understanding of this feature. There is a reference frame 810 from the reference copy that is compared with a set of patches 820, 830, 840 extracted from frames in the suspect copy around the estimated target frame. As shown in the patch correlation figure 850, the edge detection has the highest score (0.71) with the one frame 830 that shows that there is a high patch correlation. This frame is the frame before the estimated target frame as indicated by the value −1 on the x-axis of the chart 850. In one embodiment, the estimated frame from temporal alignment is centered on the figure 850 and an equal number of frames are selected before and after the frame. The number of selected frames is set a priori based on the error expectation for the temporal alignment process. The mark score for this process is assigned a value of 0.71, based on the edge correlation score.

According to one embodiment, a copied work is loaded into the system and low-level image features are extracted. The copied work is temporally aligned with a reference work with known forensic cues, by the means of phase correlation of the extracted image features. In addition, the work is spatially aligned with the reference work, by minimization of disjoint information, maximization of mutual information, or optimization of other metrics. Spatiotemporal correlation is carried out to detect the forensic cues in the said work, transferring the domain knowledge from the reference work, and therefore tracing the unauthorized source of the media works. After analysis, an unauthorized copy is classified to an existing source group or itself becomes a unique source. Statistics of the unauthorized source distribution over time and geographical locations are extracted for further analysis.

The workflow processing provides for automation/semi-automation of the searching for forensic marks and evaluating the similarity of the copies with prior examples. The workflow process focuses the effort of limited resources on understanding new material rather than reviewing known sources.

One embodiment of the system is a workflow process to compare suspect copied versions of video and audio material to determine relationships. The analytic portion searches for common forensic markers within the copies to determine similarity. The workflow process controls the steps that are applied to each set of media files and presents results to the users for final evaluation and disposition.

The system operates in one embodiment by matching the forensic marks through video content analysis. One of the features of the system automates the time-consuming video matching and analysis process. It also increases the efficiency and effectiveness of fighting illegal distribution of high value content since it provides more timely results. One aspect relates to algorithms that are used to identify works from a particular source by matching the forensic marks through video content analysis. The analysis according to one embodiment includes such features as video decoding and feature extraction, video frame temporal alignment, frame spatial registration, and forensic mark detection. While the examples refer to digital movies, the system and processing is not limited to movies but can be utilized with any digital work having video frames. One skilled in the art will also recognize the audio works can leverage a similar workflow substituting audio analysis for video content analysis.

Video content analysis system and processing detailed herein make the forensic mark detection robust to a wide variety of variations, including color distortions, viewpoint distortions, frame size changes, aspect ratio changes, and boundary artifacts. In one example, the video content analysis system automatically determines if the video works are ripped from the same source.

In one example, the system transcodes the input video file to an output clip using a video codec without audio, at a specified frame rate, spatial resolution, starting time and duration. In another example, a job script is used to specify the job details, such as the encoding time, compression codec, and various filtering operations.

Due to the growing number of suspect copies entered into the system, one aspect uses certain automated and semi-automated techniques to facilitate the processing. For example, a DVD robot can be stacked with DVDs and be programmed to bulk load the discs which load the content of the suspect copies.

According to a further embodiment, the system provides a web based graphical user interface that tracks the individual status of each suspect copy of a workflow, although one skilled in the art will recognize that other interfaces such as client/server and stand-alone systems can also provide a workflow process. The suspect copies originate from sources such as CD, P2P, and tape, and are entered into the system along with some initial input data. Initial input data typically includes the media works title, where the copy is coming from and other related information such as where was it recorded, suspected origination, and purchase point are set forth.

Another feature provides a graphical user interface (GUI) for communication with the end user. It includes one or more daemon processes that can perform various data processing or analytical steps in the workflow that do not require user intervention. Multiple instances of the daemon processes can be instantiated to provide a scalable system. The GUI allows the user to specify required inputs and to review analytical results and save the final conclusions.

The system in this example consists of a GUI that allows the initial copy of the media work to be added to the system. The user identifies the media works title and a unique identification is assigned to the copy. The copy is checked against all earlier copies of that title for exact duplicate files. If none are found, then the copy will be compared with the forensic marks of known unique copies of that title. The analysis results include images of the best match and scores indicating the similarity. The user will evaluate the analysis results to confirm a match or recognize the new instance as a new unique copy. Each unique copy is reviewed manually and the forensic marks are identified as groundtruth information for the new unique reference for the analysis programs. In another embodiment, the manual confirmation step can be substituted by automatic assignment when the similarity score exceeds a confidence threshold. When a match is confirmed (manually or automatically), then selected attributes from the reference copy can be assigned to the matched suspect copy.

Another embodiment provides a consistent process when new material is received. This process provides a first-level assessment of the original source of the content that was pirated. By automating some of the analysis that searches for similarity of the forensic traces, the productivity is increased, more content can be analyzed and more sophisticated assessment of the relationships of the pirated content can be constructed.

In one embodiment the method is automated with little manual intervention. It increases system throughput and consistency, and the speed is further facilitated by more powerful machines and/or parallel computing. The analysis results in certain aspects can be used to map out the piracy patterns, enforce content protection, and fight movie piracy more effectively.

One of the embodiments includes methods and systems to trace the source of a digital work by identifying the forensic cues through image and video content analysis. For a given media work, content analysis is carried out to verify the existence of certain forensic cues in the video in order to trace the source of the work. In one of the embodiments, the system is automated or semi-automated, and the systems and methods trace the source of the reference and copied works, collect copied history over time and geographical locations, and use this information to fight illegal piracy of high value content.

There are various adjustments made during the identification processing such as spatial alignment to properly identify the forensic marks. Such adjustments can be used to facilitate the forensic mark identification. For example, works that are copied in theaters for example may have angled recording that shifts the forensic mark orientation.

In other situations, the copied work may be subject to certain modifications that make the forensic mark identification more difficult. In one example, the party that copies a protected work may subject the copied work to some post processing of the copy such that the improper copy may be altered by cropping, scaling, changing screen display and otherwise modifying the copied work. For example, the work can be scaled for optimal presentation on a PC or a particular screen display.

The present system according to one embodiment addresses this matter via some pre-analysis processing steps to facilitate the forensic mark identification. In order to account for the transformations, the system processes the works so that the expected locations of the marks are located.

As described, watermarking is the process of embedding forensic marks typically implanted by the owner of the work. Unfortunately, depending on the copying mechanism, not all copied works may have these watermarks and thus one would not be able to detect the source of the work. This may occur through the analog conversion problem by manually recording works such as by cam-cording a work in a movie theater.

In one of the embodiments, the marks are given scores with corresponding weighting in order to assess the strength of the forensic mark identification of a particular mark as well as the likelihood of identifying a source associated with that work.

Figure 9:
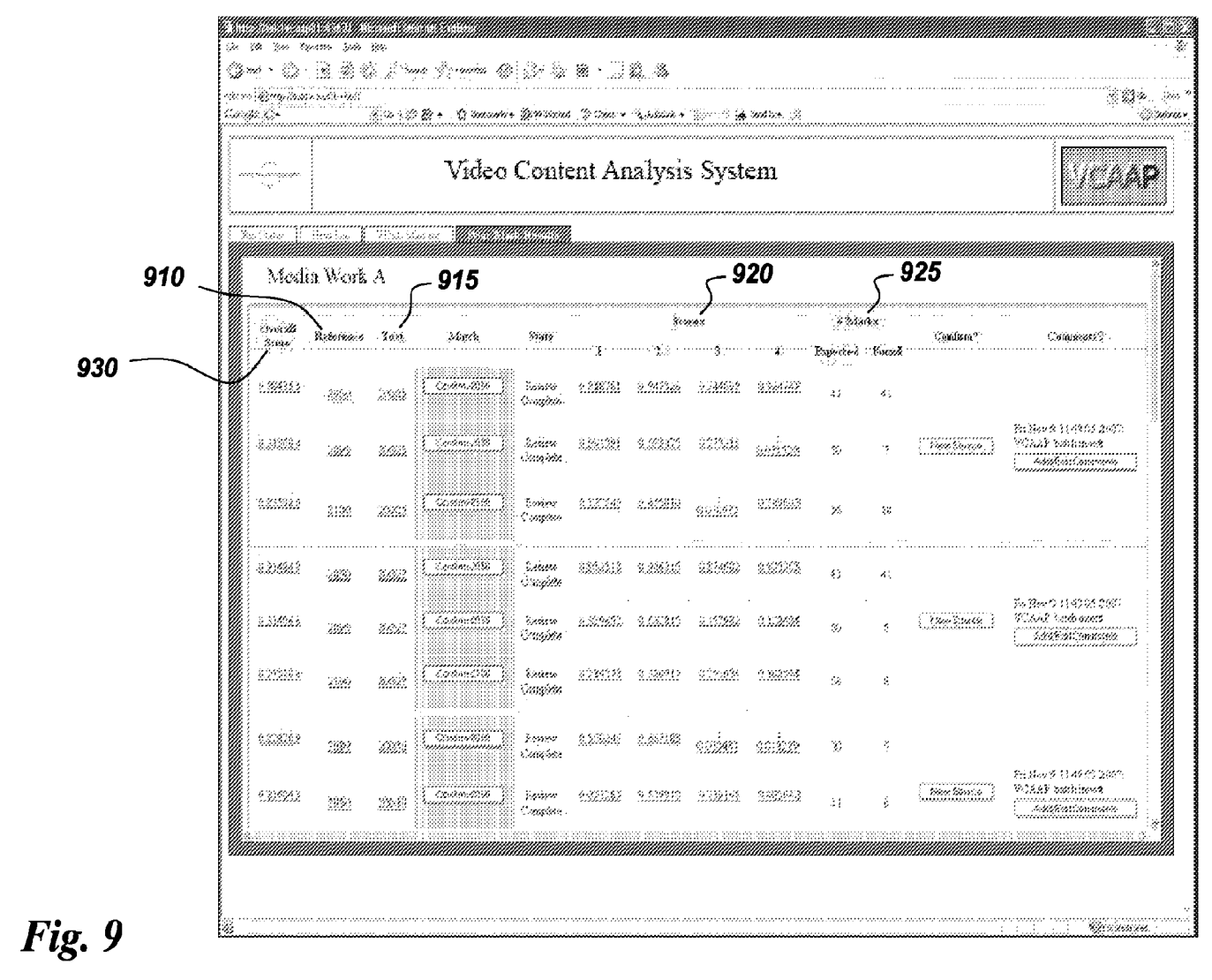

In FIG. 9, an example screenshot illustrating the scores for a particular media work are shown. Each row is the result of a single comparison of a suspect work with a known reference work. Links to additional details such as analytical charts or selected video images may be provided. Comparisons may be grouped, in particular, all comparisons for a particular suspect copy may be grouped together to facilitate identifying the best match (if one exists). Finally, the interface can provide a manual instruction via GUI elements such as a button, link or menu item to assign the suspect work to one of the references or to identify the suspect as a new reference. One skilled in the art will recognize the many variations in a GUI that provide similar functionality.

For a particular title Media Work A 905 a set of results of various comparisons is shown in FIG. 9. Each suspect (test) copy 915 is compared to various reference works 910 in the system. There may be more than a single suspect copy 915 and each row of the results table represents a comparison between a suspect copy 915 and a reference work 910. There are one or more individual scores 920 that represent the likelihood of a successful match. Each score 920 represents the score for a particular forensic insert. For video content as described herein, these may be scores representing a set of marks on a set of consecutive video frames. In other embodiments, these could be scores for individual marks or other configurations of the marks. For each reference work there is an expected number of marks in a particular test that a matching copy would expect to find 925. An overall score 930 that combines all the sub-score results is also processed and displayed in the graphical user interface. As previously noted, sometimes these marks are obscured or otherwise not viewable so the comparison can list the expected number of marks and the actual number of marks that were found. Various other visual interface options include status or state indication, buttons to re-run tests, buttons to run different tests, and a comment section.

There are a number of different types of forensic cues and markings that can identify a source of a digital work, and some examples are illustrated in FIGS. 10*a*-10*d*. As noted herein, identifying cues can be unintentional byproducts of the copying. For example, referring to FIG. 10*a*, dirt 1010 may be imparted into the copied work in various frames and can aid in uniquely identifying the copies from this source. A digital work may also have scratches or tears 1015 such as shown in FIG. 10*b* that can also be used to identify a work.

Referring to FIGS. 10*c* and 10*d*, for improper copies that are made in theaters, audience interaction 1020, 1035 is a unique identifier. There may also be theater lighting 1025 that can be imparted into certain frames and identify a copied work. As shown in FIG. 10*d*, tiled or angled frames 1030 may identify a copied work. For works that are taped or recorded at shows and theatres, audience interaction can be recorded and become a tool for identifying the unauthorized copies. Theatre lighting and environmental factors can also be utilized to find the source of copies as these may be unique attributes and features. Various markings can also be employed such that the forensic marks are not generally discernable but are used to match suspect copies to confirm that it is from an improper copy. In one example, there may be dirt or scratches that are used to show processing identifiers as opposed to the integrated constellation marks imparted by the original owner of the work. One aspect of the system searches for marks that appear/disappear or is otherwise only available for a few frames to uniquely identify that work.

Figure 11B:
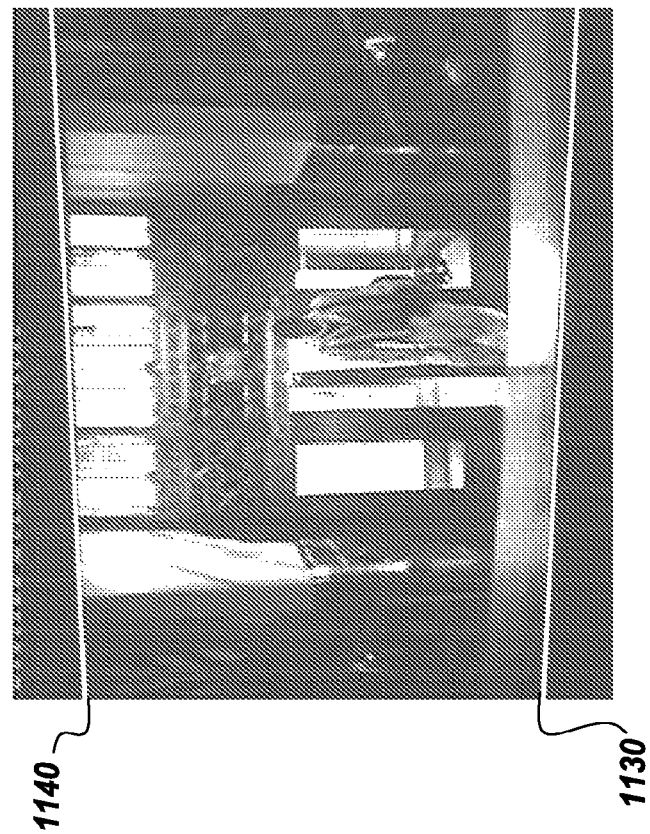
FIGS. 11a and 11b illustrates camcorder viewpoint processing.
Figure 11A:
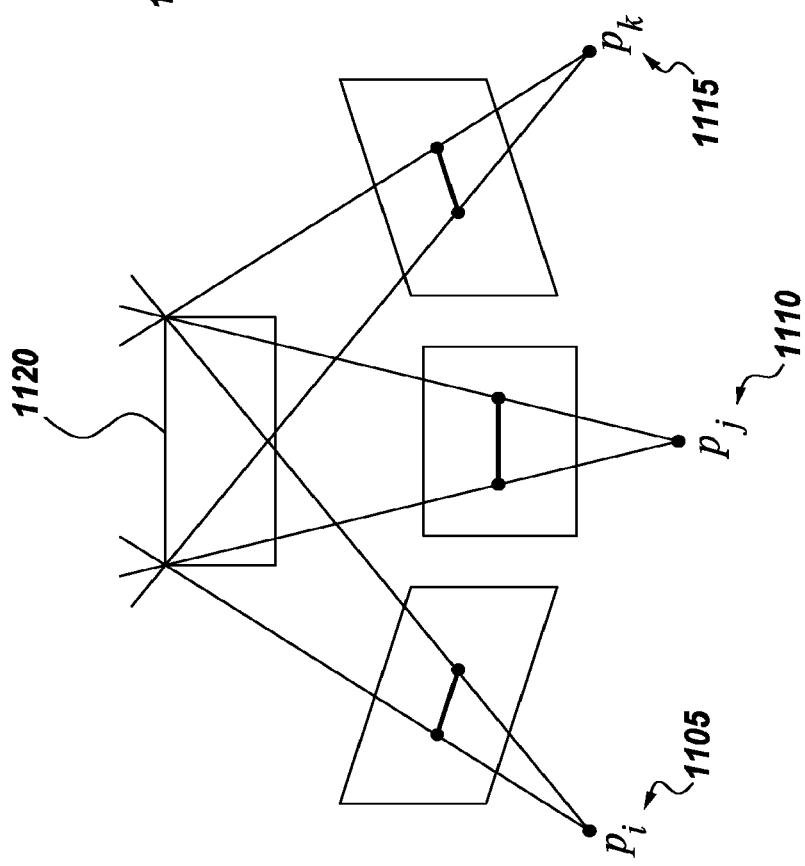

As noted, recording devices, such as a camcorder, may impart a viewpoint discriminator due to the angle of the recording. As shown in FIGS. 11*a* and 11*b*, the recording device viewpoint creates discriminating signatures that can be used to distinguish between copies and identify all the copies originating from a particular source.

In one illustrative embodiment, for simplicity, is a movie presented on a movie screen 1120. A video recording camera can be positioned at any location with respect to the screen 1120. The camera can be at position Pi 1105 on the left side of the screen center, at position Pj 1110 about the center of the screen, or at position Pk 1115 on the right side of the screen center. If the camera is positioned on the left or right side of the screen center, there is a viewpoint shift in the angular orientation causing the images to have an angled perspective 1130, 1140 in relation to a center viewpoint such that the taped image creates a discriminating signature for that particular copy that can be used to uniquely identify any further copy from that source.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description.

What is claimed is:

1. A method, comprising:
   aligning at least one suspect image frame of a suspect work with at least one reference image frame of a reference work, wherein aligning comprises:
      temporally aligning the at least one suspect image frame with the at least one reference image frame; and
      spatially aligning the at least one suspect image frame with the at least one reference image frame;
   identifying one or more reference forensic marks in the at least one reference image frame, wherein the one or more reference forensic marks comprise at least one non-embedded forensic mark; and
   determining, based on the at least one non-embedded forensic mark of the one or more reference forensic marks in the at least one reference image frame, whether the reference work corresponds to the suspect work.

2. The method of claim 1, wherein determining whether the reference work corresponds to the suspect work comprises matching the at least one non-embedded forensic mark of the at least one reference image frame with one or more suspect forensic marks in the at least one suspect image frame.

3. The method of claim 2, wherein matching the at least one non-embedded forensic mark of the at least one reference image frame with the one or more suspect forensic marks in the at least one suspect image frame comprises:
   identifying the one or more suspect forensic marks in the at least one suspect image frame; and
   comparing the at least one non-embedded forensic mark of the at least one reference image frame with the one or more suspect forensic marks identified in the at least one suspect image frame.

4. The method of claim 3, wherein comparing the at least one non-embedded forensic mark of with the one or more suspect forensic marks comprises scoring a similarity between the at least one non-embedded forensic mark of the at least one reference image frame and the one or more suspect forensic marks identified in the at least one suspect image frame.

5. The method of claim 1, wherein determining whether the reference work corresponds to the source of the suspect work comprises searching the at least one suspect image frame for correspondence with the at least one non-embedded forensic mark of the at least one reference image frame.

6. The method of claim 5, wherein searching the at least one suspect image frame comprises determining a location of the at least one non-embedded forensic mark of the at least one reference image frame and searching a corresponding location of the at least one suspect image frame for features corresponding to the at least one non-embedded forensic mark of the at least one reference image frame.

7. The method of claim 1, wherein temporally aligning comprises:
   extracting low-level image features from the at least one reference image frame and from the at least one suspect image frame; and
   aligning the low-level image features of the at least one reference frame with the low-level image features of the at least one suspect image frame.

8. The method of claim 7, wherein the low-level image features comprise one or more of a color histogram change, a Minkowski distance, or a histogram intersection, or a combination thereof.

9. The method of claim 1, wherein temporally aligning further comprises scene change detection, normalizing a sampling rate, or phase correlation of low-level features, or a combination thereof.

10. The method of claim 1, wherein the at least one non-embedded forensic mark comprises imagery of a speck of dirt, a scratch, a perspective distortion, an audience interaction, or a combination thereof.

11. The method of claim 1, wherein determining whether the reference work is the source of the suspect work comprises scoring a similarity between the at least one reference image frame and the at least one suspect image frame based on the at least one non-embedded forensic mark of the at least one reference image frame.

12. The method of claim 1, wherein spatially aligning comprises minimization of disjoint information, maximization of mutual information, or optimization of metrics, or a combination thereof.

13. A method, comprising:
aligning reference image frames of a reference work with suspect image frames of a suspect work, wherein aligning comprises:
spatially aligning the suspect image frames with the reference image frames; and
temporally aligning the suspect image frames with the reference image frames;
identifying one or more reference forensic marks in the reference image frames, wherein the one or more reference forensic marks comprise at least one non-embedded forensic mark; and
scoring a similarity between the reference work and the suspect work based on the at least one non-embedded forensic mark of the one or more reference forensic marks identified in the reference image frames.

14. The method of claim 13, wherein scoring the similarity between the reference work and the suspect comprises searching the suspect image frames for correspondence with the at least one non-embedded forensic mark in the reference image frames.

15. The method of claim 13, wherein scoring the similarity between the reference work and the suspect work comprises:
identifying one or more suspect forensic marks in the suspect image frames, wherein the one or more suspect forensic marks comprise at least one additional non-embedded forensic mark; and
comparing the at least one non-embedded forensic mark of the reference image frames with the at least one additional non-embedded forensic mark of the suspect image frames.

16. The method of claim 13, wherein temporally aligning comprises:
extracting low-level image features from the reference image frames of the reference work and from the suspect image frames of the suspect work; and
aligning the low-level image features of the suspect image frames with the low-level image features of the reference image frames.

17. The method of claim 13, wherein temporally aligning further comprises scene change detection, normalizing a sampling rate, phase correlation of low-level features, or a combination thereof.

18. A system, comprising:
a processor;
at least one memory configured to store a reference work comprising reference image frames and a suspect work comprising suspect image frames;
an alignment section that, when executed by the processor, performs temporal alignment and spatial registration between the reference image frames and the suspect image frames;
a mark detection section that, when executed by the processor, identifies at least one reference forensic mark in the reference image frames and at least one suspect forensic mark in the suspect image frames, wherein the at least one reference forensic mark comprises at least one reference non-embedded forensic mark, and the at least one suspect forensic mark comprises at least one suspect non-embedded forensic mark; and
a mark comparison section that, when executed by the processor, determines, based on the at least one suspect non-embedded forensic mark and the at least one reference non-embedded forensic mark, whether the reference work corresponds to the suspect work.

19. The system of claim 18, wherein temporally aligning comprises:
extracting low-level image features from the reference image frames of the reference work and from the suspect image frames of the suspect work; and
aligning the low-level image features of the suspect image frames with the low-level image features of the reference image frames.

20. The system of claim 18, wherein temporally aligning further comprises change detection, normalizing a sampling rate, phase correlation of low-level features, or a combination thereof.

* * * * *